(12) United States Patent  (10) Patent No.: US 8,692,770 B2
Itoh  (45) Date of Patent: Apr. 8, 2014

(54) OPERATION APPARATUS HAVING A UNIT MOVABLE ON A TWO-DIMENSIONAL OPERATION SURFACE

(75) Inventor: Masahiro Itoh, Ichinomiya (JP)

(73) Assignee: Denso Corporation, Kariya (JP)

(*) Notice: Subject to any disclaimer, the term of this patent is extended or adjusted under 35 U.S.C. 154(b) by 888 days.

(21) Appl. No.: 12/874,348

(22) Filed: Sep. 2, 2010

(65) Prior Publication Data

US 2011/0057909 A1 Mar. 10, 2011

(30) Foreign Application Priority Data

Sep. 4, 2009 (JP) .................. 2009-205055

(51) Int. Cl.
| | | |
|---|---|---|
| *G09G 5/08* | (2006.01) | |
| *G06F 1/16* | (2006.01) | |
| *H04N 5/232* | (2006.01) | |
| *G06F 17/00* | (2006.01) | |
| *G06F 19/00* | (2011.01) | |
| *G05G 9/047* | (2006.01) | |
| *B25J 17/00* | (2006.01) | |
| *B25J 17/02* | (2006.01) | |
| *B25J 18/00* | (2006.01) | |
| *G05G 11/00* | (2006.01) | |
| *H01H 9/26* | (2006.01) | |
| *H01H 67/14* | (2006.01) | |

(52) U.S. Cl.
USPC ............ 345/161; 200/177; 200/7; 200/179; 200/8 R; 200/17 R; 200/18; 200/5 R; 200/6 R; 200/6 A; 74/471 XY; 74/490.01; 74/490.07; 74/490.08; 74/490.13; 74/503; 463/38; 361/679.1; 361/679.18; 348/211.7

(58) Field of Classification Search
CPC .......... G05G 9/047; G05G 2009/0474; G06F 3/0362; G06F 3/033; G06F 3/016; G06F 3/0338; G06F 3/0354; G06F 3/03541; H01H 19/58; H01H 19/62; H01H 13/70; H01H 13/702; H01H 25/041; H01H 67/26; H01H 67/12

USPC ............ 348/211.7; 345/161; 200/177, 7, 179, 200/8 R, 17 R, 18, 5 R, 6 R, 6 A; 74/471 XY, 74/490.01, 490.07, 490.08, 503, 490.13; 463/38; 361/679.1, 679.18

See application file for complete search history.

(56) References Cited

U.S. PATENT DOCUMENTS 4,961,468 A * 10/1990 Crowell .......................... 173/39
5,821,920 A * 10/1998 Rosenberg et al. ........... 345/156

(Continued)

FOREIGN PATENT DOCUMENTS

| JP | 6-43731 | 6/1994 |
|---|---|---|
| JP | 2000-112650 | 4/2000 |

(Continued)

OTHER PUBLICATIONS

The Kinematic Design of the New Endoscope Manipulator System (EMS) for Functional Endoscopic Sinus Surgery and Familiar Techniques in ENT Surgery; Published in IFMBE Proceedings; held Sep. 7-10, 2009.*

*Primary Examiner* — Dwayne Bost
*Assistant Examiner* — Nalini Mummalaneni
(74) *Attorney, Agent, or Firm* — Nixon & Vanderhye PC

(57) ABSTRACT

A movable operation unit is movable on a two-dimensional operation surface of a main body. The two-dimensional operation surface is defined by an X-axis and a Y-axis perpendicular to each other. A Y-axis movable portion is rotatable around a rotation axis. The Y-axis movable portion is movable in the Y-axis direction when rotating around the rotation axis. The rotation axis extends in the X-axis direction relative to the main body. The Y-axis movable portion includes a sliding rail portion on which the movable operation unit is slidable in the X-axis direction. The movable operation unit is operable to slide in the X axial direction and move in the Y axial direction accompanied with rotation of the Y-axis movable portion around the rotation axis to performs a parallel shift in the two dimensional direction while regularly and constantly maintaining a posture of the movable operation unit.

16 Claims, 18 Drawing Sheets

(56) References Cited

U.S. PATENT DOCUMENTS

| | | | |
|---|---|---|---|
| 7,821,496 B2* | 10/2010 | Rosenberg et al. | 345/161 |
| 2002/0030664 A1* | 3/2002 | Schena et al. | 345/163 |
| 2006/0191775 A1* | 8/2006 | Edmunds | 200/6 A |
| 2008/0229860 A1* | 9/2008 | Bonev | 74/479.01 |
| 2008/0249668 A1* | 10/2008 | Miyata et al. | 701/1 |
| 2010/0073291 A1 | 3/2010 | Hisatsugu et al. | |
| 2010/0305780 A1* | 12/2010 | Sataka | 701/3 |
| 2011/0303038 A1* | 12/2011 | Peterson et al. | 74/471 XY |

FOREIGN PATENT DOCUMENTS

| | | |
|---|---|---|
| JP | 2007-041713 | 2/2007 |
| JP | 2008-173757 | 7/2008 |
| JP | 2008-269802 | 11/2008 |
| JP | 2009-093899 | 4/2009 |

* cited by examiner

OPERATION APPARATUS HAVING A UNIT MOVABLE ON A TWO-DIMENSIONAL OPERATION SURFACE

CROSS REFERENCE TO RELATED APPLICATIONS

This application is based on and incorporates herein by reference Japanese Patent Application No. 2009-205055 filed on Sep. 4, 2009.

FIELD OF THE INVENTION

The present invention relates to an operation apparatus.

BACKGROUND OF THE INVENTION

A known operation apparatus such as a pointing device is operable on a two-dimensional operation surface specified by the Y-axis and the X-axis perpendicular to each other. In such an operation apparatus, when an operation knob is moved on the two-dimensional operation surface, the operation knob may be rotated around the Z-axis, which is perpendicular to the X-axis and the Y-axis. When an operation knob has a simple design such as a circular shaped design in a single color, the user may not visually recognize rotation of the operation knob even when being rotated. Alternatively; when an operation knob is in a rectangle shape or when an operation knob has a surface with a texture, the appearance of the operation knob may be spoiled when rotated. Consequently, design of the operation knob may be spoiled.

For example, Japanese Patent Application 2008-246263, which corresponds to U.S. patent application Ser. No. 12/564,330, discloses an operation apparatus configured to restrain rotation of an operation knob around the Z-axis. Specifically, the operation apparatus includes an X-Y slide mechanism having an X slider configured to parallel shifting of the operation knob in the X-axis direction and a Y slider configured to parallel shifting of the operation knob together with the X slider in the Y-axis direction. Both the X slider and the Y slider of the operation apparatus are configured to guide movement of the operation knob in both the X-axis direction and the Y-axis direction and restrain rotation of the operation knob around the Z-axis. However, in the operation apparatus, an operation feeling may not be satisfying. Specifically, the moving operation of the operation knob is caused by sliding the X-Y slide mechanism in different two directions of the X-axis direction and the Y-axis direction against sliding friction. In particular, an operation feeling may be notedly spoiled when the operation knob is moved in an oblique direction between the X-axis direction and the Y-axis direction. In addition, in such a moving operation in an oblique angle, a play (backlash) may occur when sliding in the X-axis direction and the Y-axis direction is alternately repeated.

Further, it is noted that a known operation apparatus includes a linkage mechanism having link arms including two or more link-connected link arms and an operation knob mounted to the end of the linkage mechanism. In such an operation apparatus, a rotation shaft functions as a movable point. Therefore, play and backlash may be reduced when the operation knob is exerted with a liner sliding motion and moved in the two directions. However, in such an operation apparatus, the operation knob may be easily rotated around the Z-axis. Publication of Japanese Patent Application 2008-173757 (JP-A-2008-173757), which corresponds to U.S. patent application Ser. No. 12/564,430, discloses an operation apparatus provided with such a linkage mechanism. Specifically, the operation apparatus includes a five-joint linkage mechanism for enabling two-dimensional movement of the operation knob and further includes a parallel linkage mechanism to restrict rotation of the operation knob around the Z-axis. Nevertheless, in this case, the number of components increases, and a manufacturing cost also increases.

SUMMARY OF THE INVENTION

In view of the foregoing and other problems, it is an object of the present invention to produce an operation apparatus at low cost, the operation apparatus including an operation knob operable smoothly on a two-dimensional operation surface while maintaining the posture of the operation knob.

According to one aspect of the present invention, an operation apparatus comprises of a main body. The operation apparatus further comprises of a movable operation unit movable on a two-dimensional operation surface of the main body, the two-dimensional operation surface defined by an X-axis and a Y-axis perpendicular to each other. The operation apparatus further comprises of a Y-axis movable object including a Y-axis movable portion movable in the Y-axis direction when rotating around an rotation axis, the rotation axis extending in the X-axis direction relative to the main body. The Y-axis movable portion includes a sliding rail portion on which the movable operation unit is slidable in the X-axis direction. The movable operation unit is operable to slide in the X axial direction and move in the Y axial direction accompanied with rotation of the Y-axis movable portion around the rotation axis to perform a parallel shift in the two dimensional direction while regularly and constantly maintaining a posture of the movable operation unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 1:
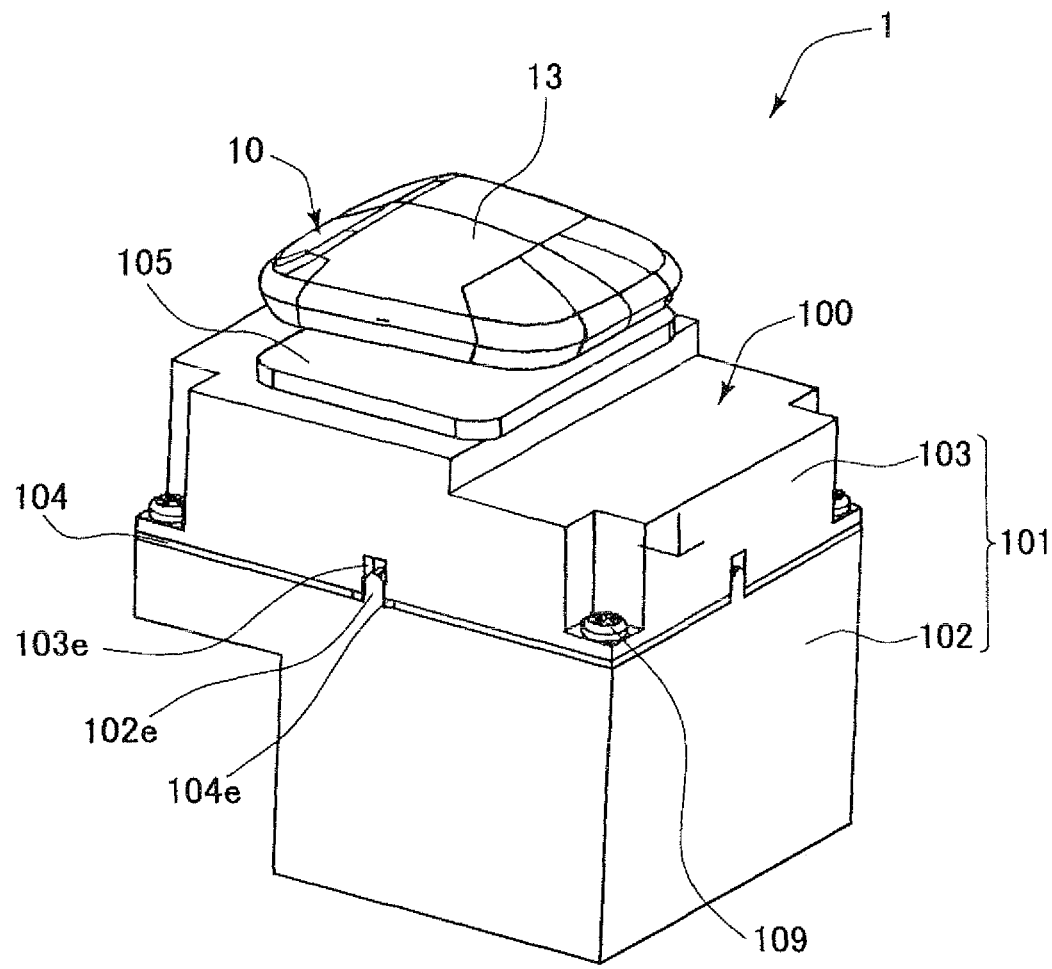
FIG. 1 is a perspective view showing a operation apparatus according to one embodiment.
Figure 2:
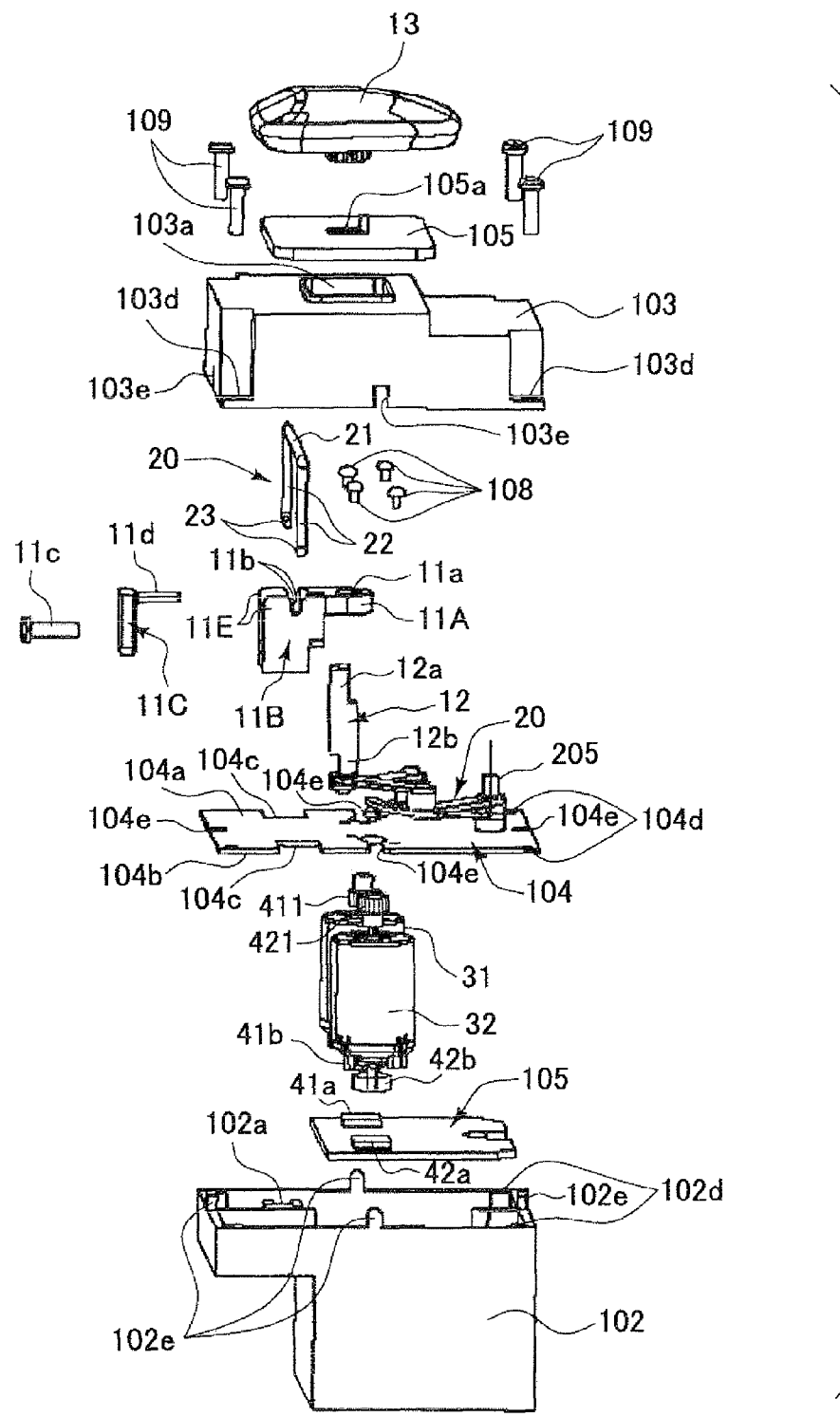
FIG. 2 is an exploded perspective view showing the operation apparatus.
Figure 3:
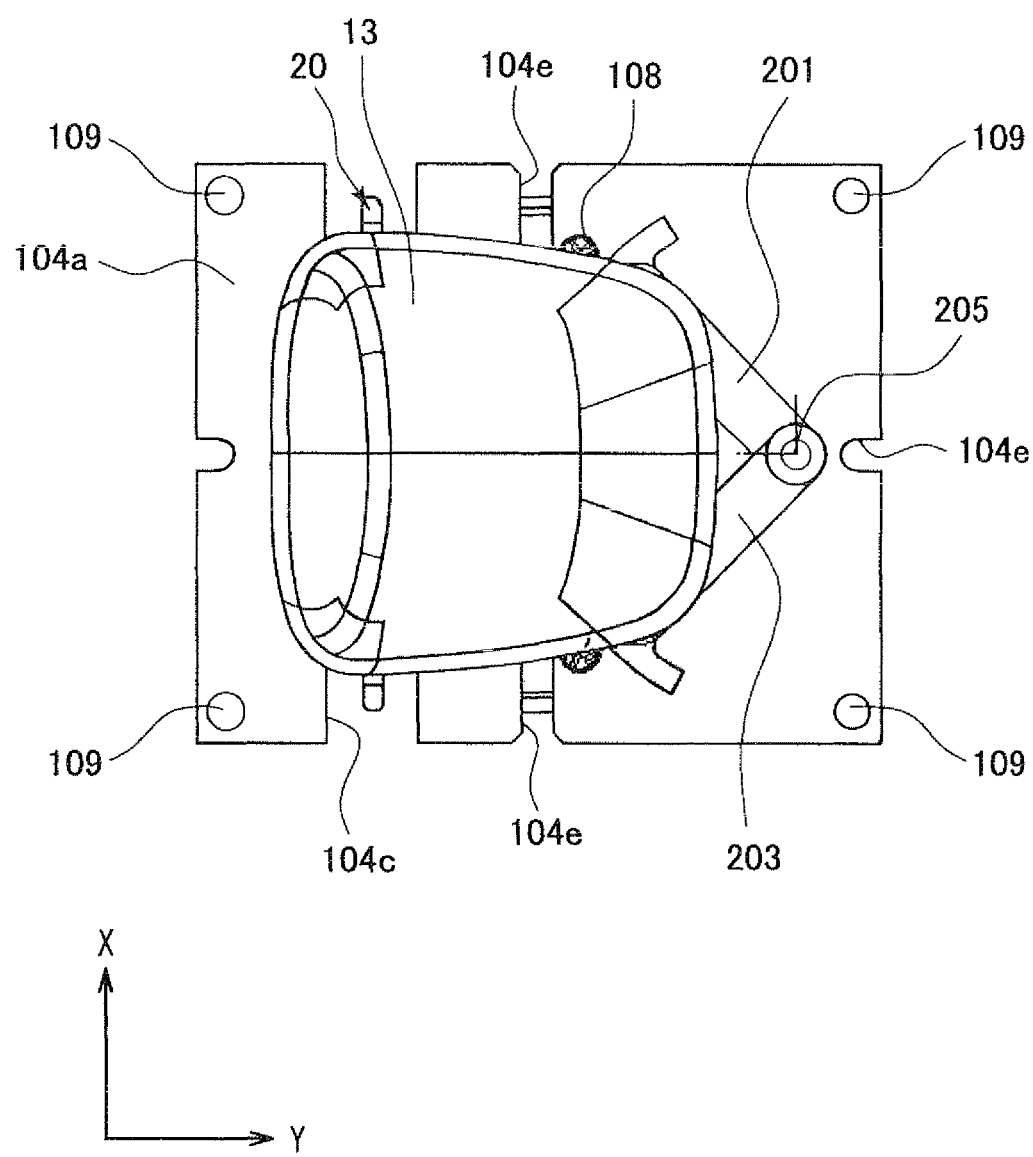
FIG. 3 is a tip view of the operation apparatus.
Figure 4:
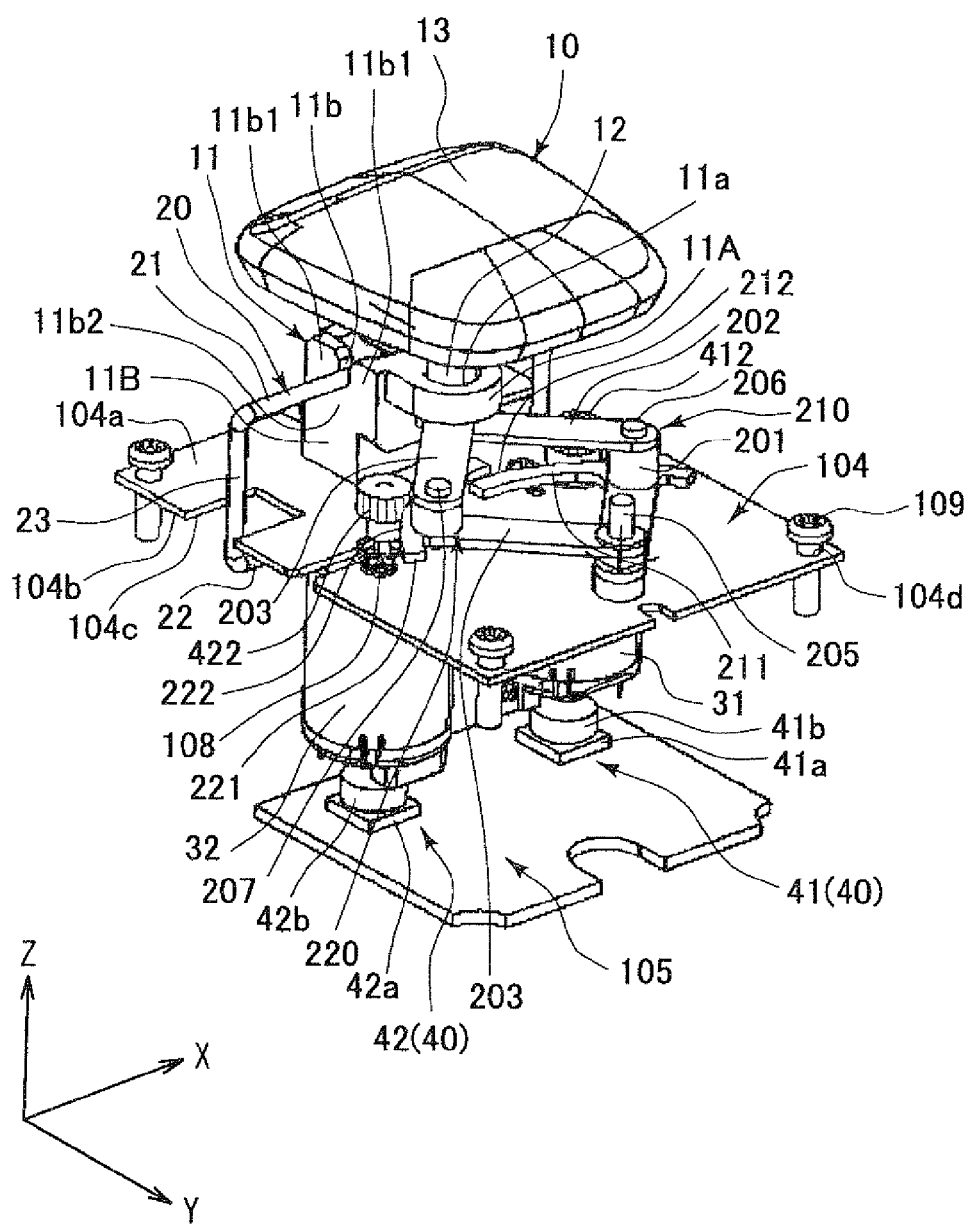
FIG. 4 is a perspective view showing an inner structure of the operation apparatus when an upper cover is removed from the operation apparatus.
Figure 5A:
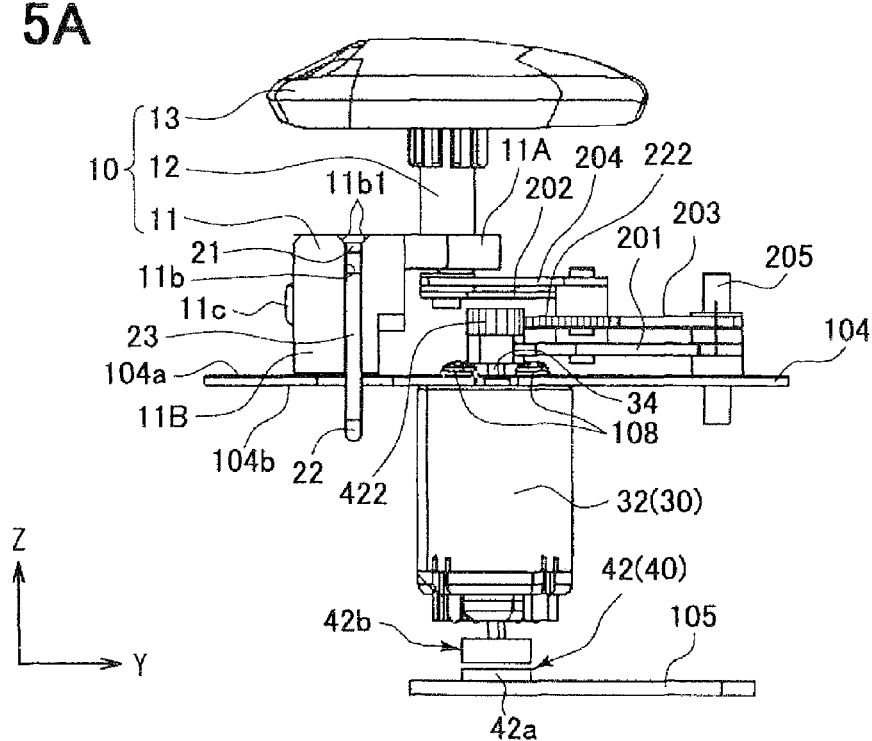
FIG. 5A is a side view showing the operation apparatus of FIG. 4.
Figure 5B:
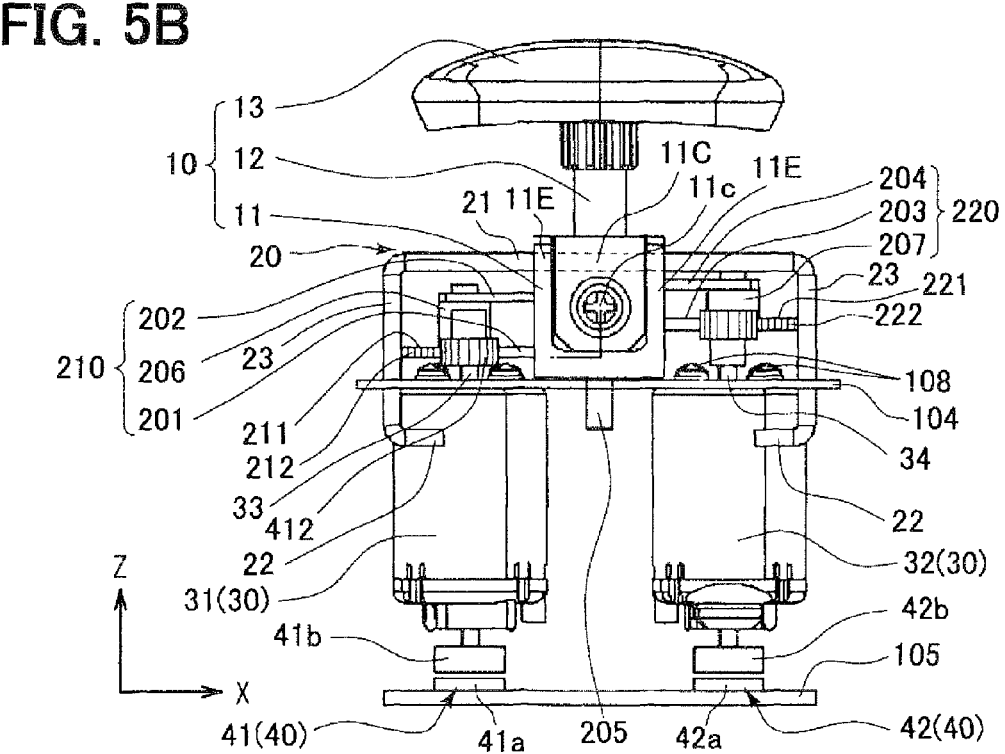
FIG. 5B is a front view showing the operation apparatus of FIG. 4.
Figure 6:
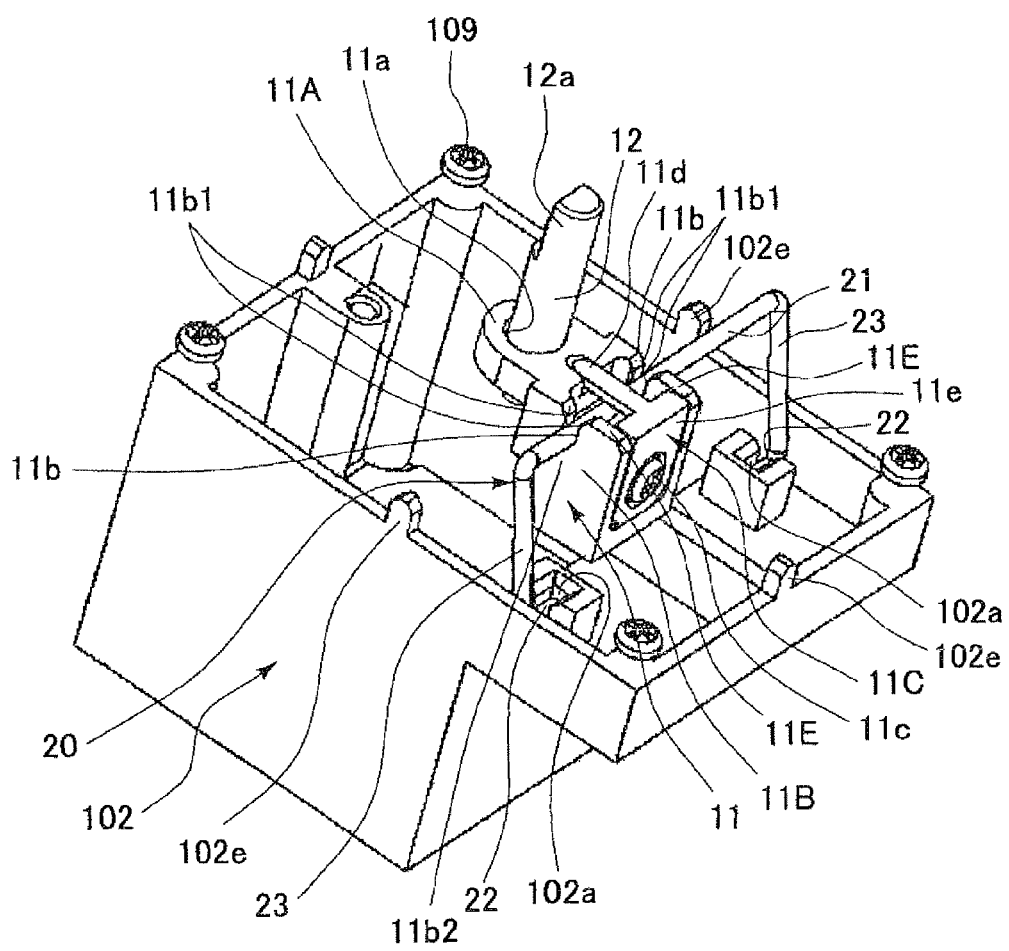
FIG. 6 is a perspective view showing the operation apparatus in which a swing member is assembled to a sliding member.
Figure 7:
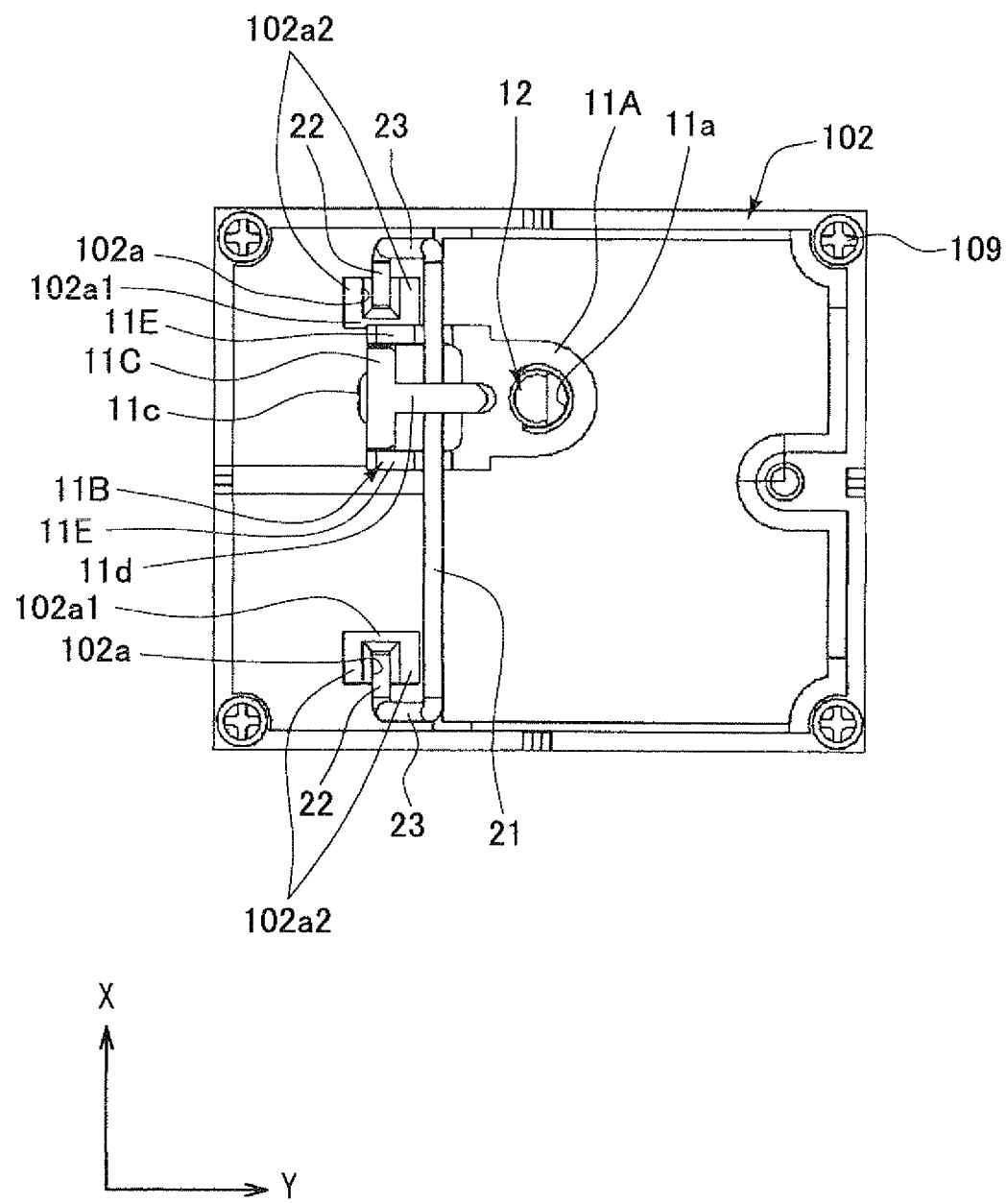
FIG. 7 is a bottom view showing the operation apparatus of FIG. 6.
Figure 8:
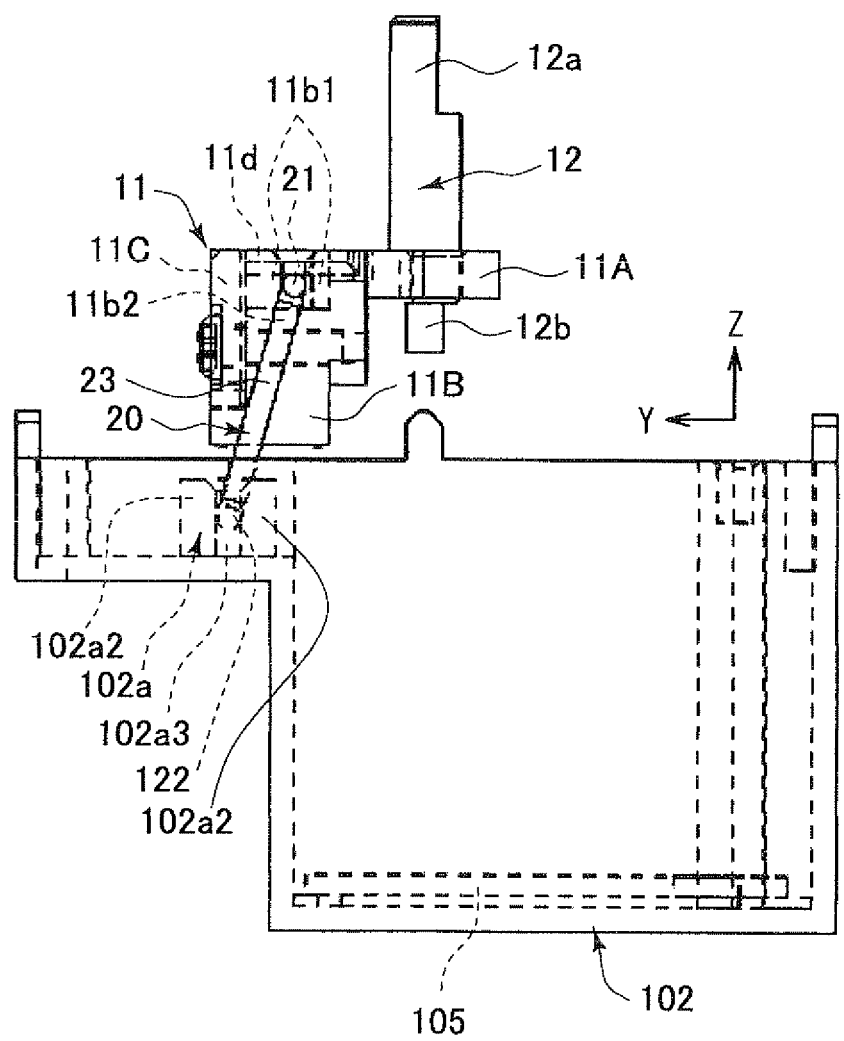
FIG. 8 is a side view showing the operation apparatus of FIG. 6.
Figure 9A:
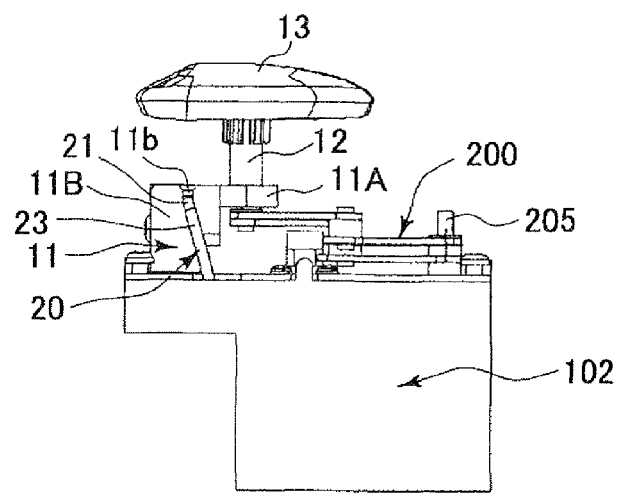
FIGS. 9A, 9B, 9C are side views showing an operation of the operation apparatus in a Y-axis direction.
Figure 9B:
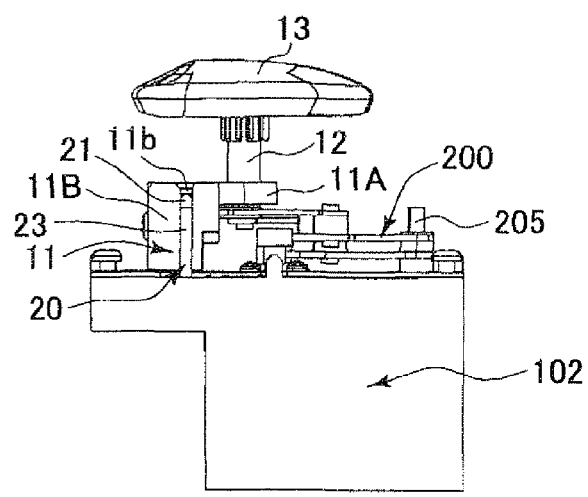
Figure 9C:
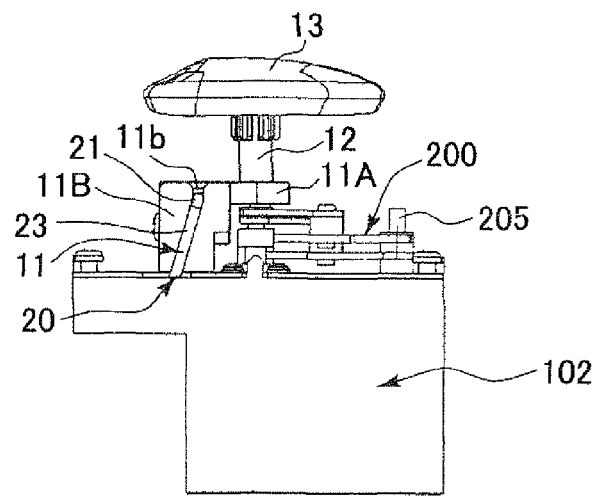
Figure 10A:
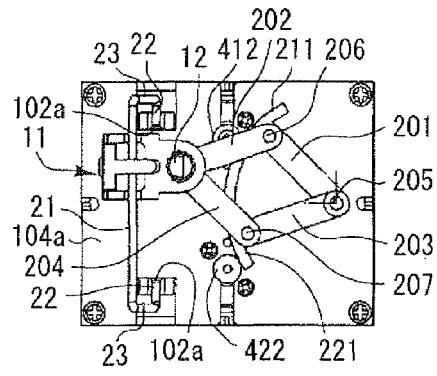
FIGS. 10A to 10G are top views showing an operation of the operation apparatus of FIG. 1 in a two-dimensional direction.
Figure 10E:
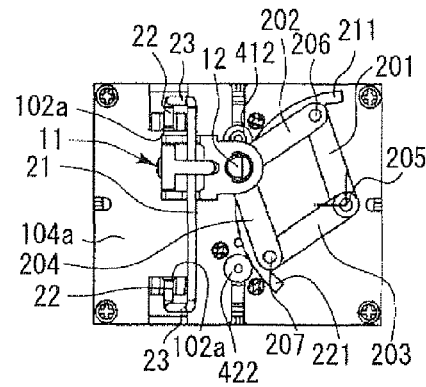
Figure 10B:
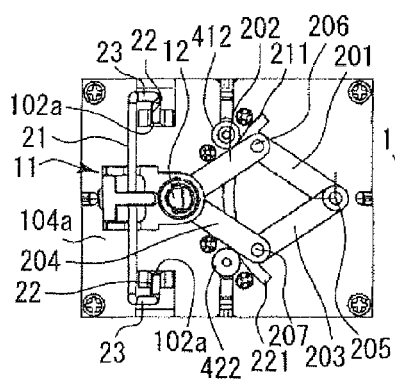
Figure 10D:
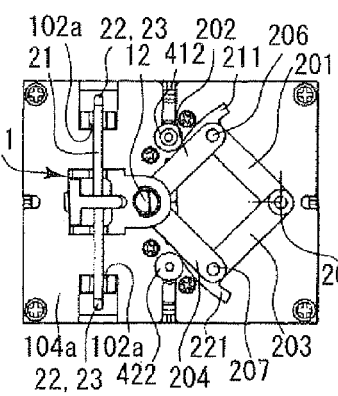
Figure 10F:
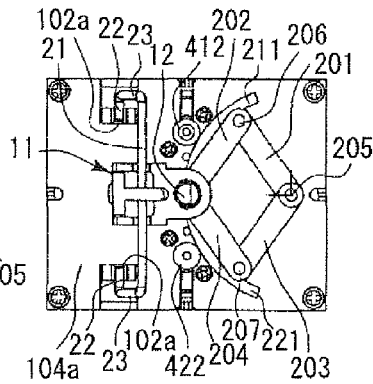
Figure 10C:
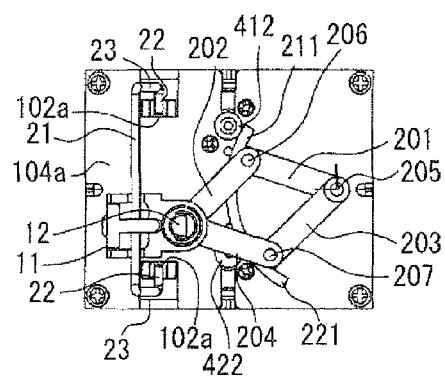
Figure 10G:
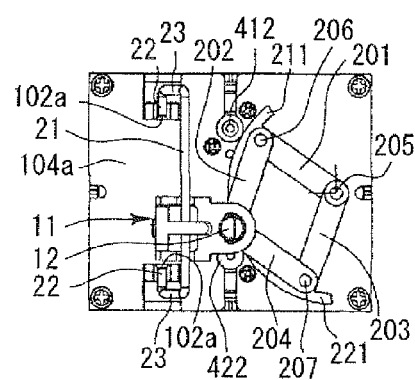
Figure 11:
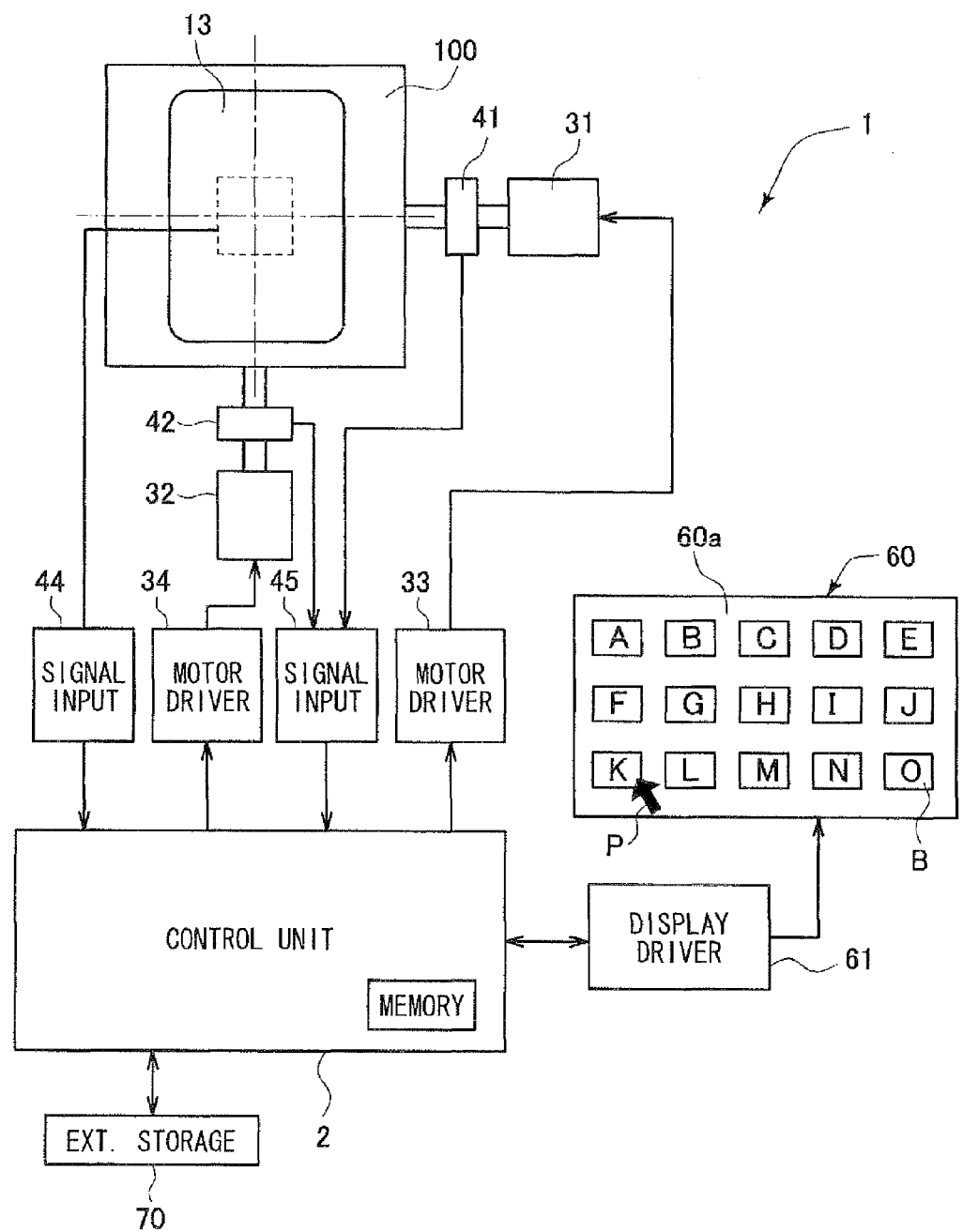
FIG. 11 is a block diagram showing the operation apparatus according to the embodiment.
Figure 12:
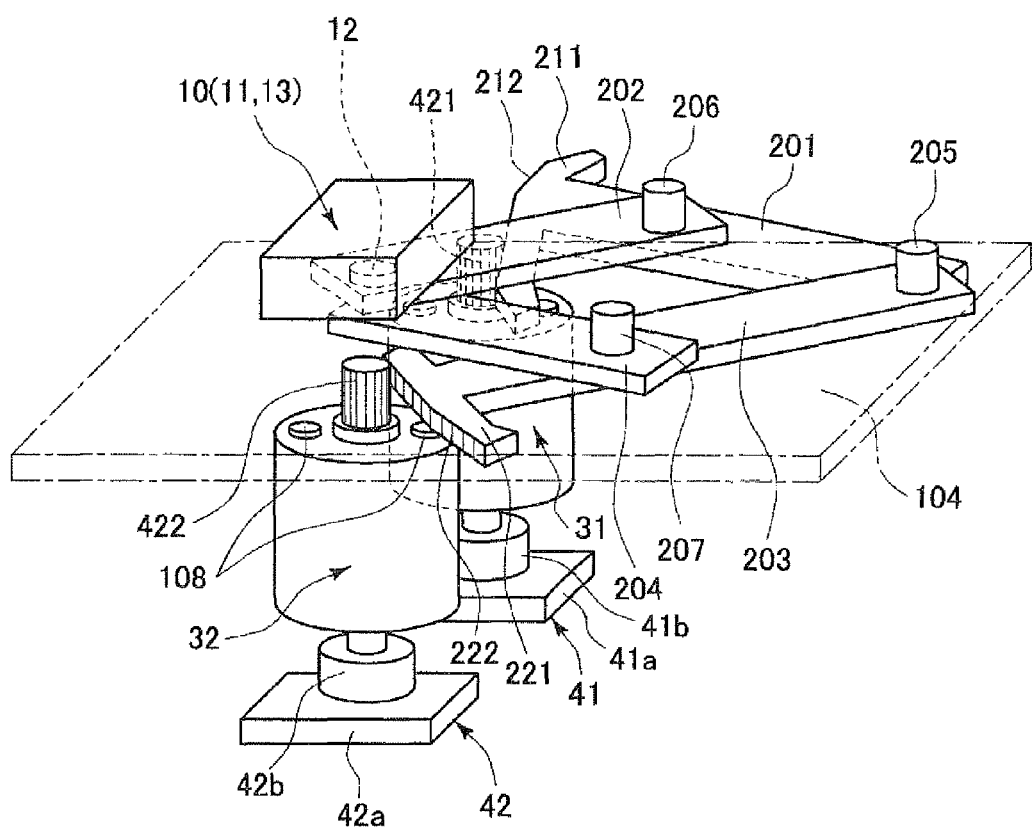
FIG. 12 is a schematic perspective view showing a linkage mechanism of the operation apparatus of FIG. 1.

As follows, an embodiment of an operation apparatus will be described with reference to drawings. FIG. 1 is a perspective view showing the operation apparatus according to one embodiment. FIG. 2 is an exploded perspective view showing the operation apparatus. FIG. 3 is a top view showing the operation apparatus. FIG. 4 is a perspective view showing an inner structure of the operation apparatus when an upper cover is removed from the operation apparatus. FIG. 5A is a side view of FIG. 4, and FIG. 5B is a front view of FIG. 4. FIG. 6 is a perspective view showing the operation apparatus in which a swing member is assembled to a sliding member. FIG. 7 is a top view of FIG. 6. FIG. 8 is a side view of FIG. 6. FIGS. 9A to 9C are side views each explaining movement of the operation apparatus in the Y-axis direction, FIGS. 10A to 10G are top views each explaining movement of the operation apparatus in two dimensional direction. FIG. 11 is a block diagram showing the operation apparatus according to the embodiment. An operation apparatus 1 shown in FIG. 1 includes a main body 100 and a movable operation unit 10 located on the main body 100. The movable operation unit 10 is movable in a predetermined two-dimensional operation surface including an X-axis and a Y-axis. The X-axis represents a predetermined direction. The Y-axis is perpendicular to the X-axis. The operation apparatus 1 is an in-vehicle operation device mounted to a vehicle such as an automobile. The movable operation unit 10 is located on the upper side of the operation apparatus 1 in the gravity direction (Z-axis direction) and movable in both the X-axis direction and the Y-axis direction. The Z-axis direction is perpendicular to both the X-axis direction and the Y-axis direction. The Y-axis direction is along the frontward to rearward direction (longitudinal direction). The X-axis direction is along the leftward to rightward direction (horizontal direction, width direction). As shown in FIG. 11, the operation apparatus 1 is used for moving a pointing image (pointer) P indicated on a screen 60a of a display device 60 according to an operation of a user.

As shown in FIGS. 2 to 8, the main body 100 includes an apparatus case 101 and a swing member 20. The swing member 20 is supported so that the swing member 20 can be swung around the X-axis relative to the apparatus case 101. The swing member 20 is mounted with the movable operation unit 10 having an operation knob 13 on the side of a swing end (on the outer side beyond a swing axis). The movable operation unit 10 is slidable relative to the swing member 20.

The apparatus case 101 includes a lower case 102 and an upper case 103. The apparatus case 101 accommodates the swing member 20 and a sliding member 11 of the movable operation unit 10 (described later). The lower case 102 and the upper case 103 are fixed to each other to interpose a base plate 104 therebetween. Specifically, the lower case 102 and the upper case 103 are screwed using a fastening member 109. The lower case 102 has an opening end on the upper side in the Z-axis direction. The opening end of the lower case 102 is provided with multiple fitting portions (engaging protrusions) 102e projecting in the Z-axis direction from multiple locations. The upper case 103 and the base plate 104 are respectively provided with fitted portions (engaged grooves) 103e and 104e to be fitted to the fitting portions 102e. The fitting portions 102e and the fitted portions 103e function as a positioning unit.

The movable operation unit 10 includes the sliding member 11, an operation shaft portion 12, and the operation knob 13. The sliding member 11 is slidable in the X-axis direction relative to the swing member 20. The operation shaft portion 12 is integrally mounted to the sliding member 11 so that the operation shaft portion 12 is not rotatable around the Z-axis. The operation knob 13 is mounted to the upper end of the operation shaft portion 12 in the Z-axis direction so that the operation knob 13 is not rotatable around the Z-axis. The sliding member 11 is slidable in the upper case 103 along a main surface 104a of the base plate 104. The operation shaft portion 12 projects in the Z-axis direction from an upper end opening 103a formed in the top end of the upper case 103 (described later). The upper end opening 103a is covered with a cover member 14. The cover member 14 is fixed to the operation shaft portion 12 on the lower side of the operation knob 13 in the Z-axis direction for protecting the opening. The cover member 14 is integrally mounted to the operation shaft portion 12 so that the cover member 14 is not rotatable around the Z-axis. The cover member 14 is a part of the movable operation unit 10.

The sliding member 11 has an upper end in the Z-axis direction and the upper end has a projection 11A projected frontward in the Y-axis direction. The projection 11A has a mounting opening 11a through which the operation shaft portion 12 is inserted in the Z-axis direction. Thus, the projection 11A is fixed integrally to the operation shaft portion 12. As shown in FIGS. 6 to 8, the operation shaft portion 12 is in a cylindrical shape. The operation shaft portion 12 has an upper end 12a and a lower end 12b in the Z-axis direction. Each of the upper end 12a and the lower end 12b has a non-circular cross section. The operation shaft portion 12 is mounted to the operation knob 13 and the projection 11A of the sliding member 11. Specifically, the operation knob 13 and the projection 11A of the sliding member 11 respectively have mounting openings 13a and 11a, which are in shapes corresponding to the sectional shapes of the upper end 12a and the lower-end 12b of the operation shaft portion 12. The upper end 12a and the lower-end 12b of the operation shaft portion 12 are inserted through the mounting openings 13a and 11a thereby fixed such that the operation shaft portion 12 is not rotatable around the Z-axis.

The operation knob 13 is manipulated by a user. As shown in FIG. 3, the operation knob 13 is in a shape such that rotation of the operation knob 13 is visually recognizable when rotating around the Z-axis. In the present example, the operation knob 13 is substantially in a square shape when viewed from the top and has rounded corners. According to the structure of the operation apparatus including the operation knob 13 of the present embodiment, when the operation knob 13 is operated in two-dimensional directions specified by the X-axis, the Y-axis, and combination of both the X-axis and the Y-axis, the operation knob 13 is not rotatable around the Z-axis.

As shown in FIG. 4, the swing member 20 includes a swing shaft portion 22 and a sliding rail portion 21. The swing shaft portion 22 is supported and rotatable around a swing axis, which extends in the X-axis direction relative to the operation apparatus main body 100. The sliding rail portion 21 has a swing end outside of the swing shaft portion 22. The swing end is mounted with the sliding member 11 (movable operation unit 10), which is slidable back and forth in the X-axis direction. In the present structure, the movable operation unit 10 mounted to the swing member 20 is enabled to swing back and forth in the Y-axis direction. The swing member 20 is made of a wire bent to be substantially in a horseshoe-shaped. The swing member 20 includes a tubular sliding rail portion 21, intermediate shaft portions 23, and a tubular swing shaft portion 22. The tubular sliding rail portion 21 is linearly extended in the X-axis direction. The intermediate shaft portions 23 are extended from both ends of the tubular sliding rail portion 21 in the Z-axis direction to the lower side of the tubular sliding rail portion 21 such that the intermediate shaft portions 23 are opposed to each other. The tubular swing shaft portion 22 is linearly extended from ends of both the intermediate shaft portions 23 in the X-axis direction to be close to each other.

The lower case 102 of the apparatus case 101 has swing support members 102a (FIG. 2) supporting the swing shaft portion 22 of the swing member 20 such that the swing shaft portion 22 is rotatable around the X-axis. As shown in FIGS. 7 and 8, each of the swing support members 102a is an opening in which the swing shaft portion 22 of the swing member 20 is slidably supported to be rotatable around the X-axis. The swing support member 102a is defined by X-axis opposed wall portions 102a1, Y-axis opposed wall portions 102a2, and Z-axis lower wall portions 102a3. The X-axis opposed wall portions 102a1 regulate relative movement of the supported linear swing shaft portion 22 in the X-axis direction. The Y-axis opposed wall portions 102a2 interpose the supported swing shaft portion 22 in the Y-axis direction from both sides. The Z-axis lower wall portions 102a3 are located on the lower side of the supported swing shaft portion 22 in the Z-axis direction. The swing support members 102a are an opening on the upper side in the Z-axis direction to allow the relative movement of the swing shaft portion 22 in the Z-axis direction. In this way, the swing shaft portion 22 is supported by the swing support members 102a, such that movement of the swing shaft portion 22 is regulated to both sides in the X-axis direction relative to the swing support members 102a. In addition, movement of the swing shaft portion 22 is regulated to both sides in the Y-axis direction relative to the swing support members 102a. In addition, movement of the swing shaft portion 22 is permitted in the Z-axis direction relative to the swing support members 102a. In addition, rotation of the swing shaft portion 22 is permitted around the X-axis relative to the swing support members 102a. In this manner, the swing support members 102a restricts movement of the swing shaft portion 22.

In the present structure, the swing support members 102a are formed in the lower case 102 to define a pair of fitting grooves to be opposed to each other in an opposed direction along the X-axis direction. Each of the swing support members 102a opens upward in the Z-axis direction at one end on the opposite side to the opposed direction. The swing support member 102a has walls in the remaining directions to define the groove. The supported swing shaft portion 22 is located in the vicinity of the walls of the swing support member 102a via a small gap. The swing support member 102a is in a rectangular groove shape having a groove width (distance between walls) in the Y-axis direction. The groove width substantially coincides with the width (diameter) of the swing shaft portion 22. The swing shaft portion 22 of the swing member 20 is fitted into the upper portions of the pair of fitting grooves 102a in the Z-axis direction. Thereby, the swing shaft portion 22 is arranged to extend between the fitting grooves 102a.

The lower case 102 is a housing having an opening on the upper side in the Z-axis direction. The opening of the lower case 102 is covered with the base plate 104. The pair of fitting grooves 102a are opposed to each other in the X-axis direction and located in the lower case 102 on the lower side of the base plate 104 in the inside of Z-axis direction. Each swing shaft portion 22 of the swing member 20 is fitted into each fitting groove 102a. Both of the intermediate shaft portions 23 are extended from both the swing shaft portions 22 of the swing member 20 upward in the Z-axis direction. The intermediate shaft portions 23 project from an opening 104c of the base plate 104. The sliding rail portion 21 extends from the Intermediate shaft portions 23. The sliding rail portion 21 is located on the upper side of the base plate 104. The swing shaft portion 22 is opposed to a main rear surface 104b around the opening 104c of the base plate 104 and spaced from the main rear surface 104b in the Z-axis direction. The base plate 104 functions as a detachment prevention unit to restrict the swing shaft portion 22 from being pulled out upward in the Z-axis direction. The opening 104c has a width in the Y-axis direction not to disturb swing of the intermediate shaft portions 23 in the Y-axis direction accompanied by swing of the swing member 20. In addition, the opening 104c has a width in the X-axis direction not to make contact with the intermediate shaft portion 23. The width of the opening 104c is greater than the width (diameter) of the intermediate shaft portion 23 in the X-axis direction.

The sliding member 11 has a slidable holding portion 11b holding the sliding rail portion 21 such that the sliding rail portion 21 is slidable on the swing member 20 in the X-axis direction. The sliding rail portion 21 is supported by the slidable holding portion 11b such that sliding rail portion 21 is rotatable around the X-axis and movable in the Z-axis direction relative to the slidable holding portion 11b. In addition, the sliding rail portion 21 is held by the slidable holding portion 11b such that the sliding rail portion 21 is not movable in the Y-axis direction relative to the slidable holding portion 11b. A swing motion of the sliding rail portion 21 around the swing axis of the swing shaft portion 22 is enabled. The swing motion causes the sliding member 11 holding the sliding rail portion 21 to move in the Y-axis direction relative to the main body 100. That is, movement of the sliding rail portion 21 in the Y-axis direction relative to the slidable holding portion 11b of the sliding member 11 is regulated. Thereby, the swing motion causes the sliding rail portion 21 to move the sliding member 11 including the slidable holding portion 11b integrally in the Y-axis direction.

The slidable holding portion 11b extends through the sliding member 11 in the X-axis direction. The sliding rail portion (linear shaft portion) 21 is inserted in the slidable holding portion 11b. The slidable holding portion 11b supports the inserted sliding rail portion 21 to be rotatable around the X-axis. The slidable holding portion 11b supports the inserted sliding rail portion 21 to be movable in the X-axis direction. Thus, the slidable holding portion 11b is formed as an insertion groove portion (insertion opening). Specifically, as shown in FIG. 6, an insertion groove portion 11b is an opening extending in the X-axis direction to enable insertion of the tubular sliding rail portion 21 in the X-axis direction therethrough. In addition, the insertion groove portion 11b has an opening on the upper side in the Z-axis direction to enable relative movement to the inserted sliding rail portion 21 in the Z-axis direction. The insertion groove portion 11b includes a Y-axis opposed wall portions 11b1 and a Z-axis lower wall portion 11b2. The Y-axis opposed wall portions 11b1 are opposed to each other to sandwich the inserted sliding rail portion 21 therebetween from both sides in the Y-axis direction. The Z-axis lower wall portion 11b2 is located on the lower side of the inserted sliding rail portion 21 in the Z-axis direction. The sliding member 11 has ends in the X-axis direction, and the ends has opposed wall portions 11E. Each of the opposed wall portions 11E has an insertion groove portion 11b including Y-axis opposed wall portions 11b1. The insertion groove portion 11b opens on the upper side in the Z-axis direction. The sliding rail portion 21 is fitted to each of the insertion groove portions 11b from the upper portion in the Z-axis direction.

A detachment prevention member 11C is fixed to a sliding member main body 11B on the upper side of the sliding member 11 in the Z-axis direction. Specifically, the detachment prevention member 11C is screwed via a fastening member 11c to overlap the sliding member 11 in the Z-axis direction. Thereby, the detachment prevention member 11C restricts the sliding rail portion 21, which is fitted to the insertion groove portion 11b from the upper portion in the Z-axis direction to be inserted in the X-axis direction, from being detached upward in the Z-axis direction. The detachment prevention member 11C covers the gap between the opposed wall portions 11E of the sliding member main body 116 from the rear side in the Y-axis direction and the upper side in the Z-axis direction. Thus, the detachment prevention member 11C restricts movement of the sliding rail portion 21 in the Z-axis direction. A Y-axis rear cover portion 11e of the detachment prevention member 11C is fitted between the opposed wall portions 11E and fixed to the sliding member main body 11B. A Z-axis upper cover portion 11d of the detachment prevention member 11C is inserted in the Y-axis direction from the rear side and fitted to the fitting groove 11, which is formed in the upper surface of the rear side of the projection 11A in the Y-axis direction to extend in the Y-axis direction.

The sliding member 11 (movable operation unit 10) is in contact (surface contact) at the bottom surface with the base surface 104a. The base surface 104a is a main surface of the base plate 104 fixed to the apparatus case 101. Specifically, the base surface 104a is screwed to the apparatus case 101 in the Z-axis direction via a fastening member 109. Thus, the sliding member 11 is slidable above the base surface 104a. The swing shaft portion 22 is movable relative to the swing support member 102a in the Z-axis direction. Therefore, even when the swing motion of the swing member 20 around the swing axis causes the swing member 20 to move in the Z-axis direction, the position of the movable operation unit 10 in the Z-axis direction can be maintained at a constant position above the base surface 104a. In the present embodiment, the Z-axis direction coincides with the gravity direction. Therefore, the weight of the movable operation unit 10 acts to maintain the contact position (sliding position) without user's intentional activity to maintain the contact position. Therefore, user's operation burden can be mitigated. In addition, the sliding member 11 is in surface contact with the base surface 104a. Thereby, rotation of the sliding member 11 around both the X-axis and the Y-axis is regulated.

Specifically, as shown in FIGS. 9A to 9C, as the operation knob 13 is moved in the Y-axis direction, the movable operation unit 10 moves in the Y-axis direction to force the swing member 20 to cause a swing motion. Nevertheless, the movable operation unit 10 moves in parallel while maintaining the constant position in the Z-axis direction relative to the base surface 104a, irrespective to relative movement of the swing member 20 in the Z-axis direction caused by the swing motion. Alternatively, as shown in FIGS. 10A to 10G, as the operation knob 13 is moved in the X-axis direction, the operation knob 13 slides on the sliding rail portion 21 provided on the swinging end side of the swing member 20. In this case, the operation knob 13 is moved in parallel while maintaining the constant position in the Z-axis direction while being in contact with the base surface 104a, irrespective of the swing motion of the swing member 20 around the swing axis. In this manner, the movable operation unit 10 is configured to move in the Y-axis direction and move in the X-axis direction independently. Therefore, both movement can be simultaneously performed. Thus, the movable operation unit 10 enables to move the operation knob 13 on the two-dimensional plane specified by the X-axis and the Y-axis. Movement of the movable operation unit 10 in the Y-axis direction and the X-axis direction are independent from each other. The movement of the movable operation unit 10 is a parallel movement and does not to change its posture. Consequently, in the movement of the movable operation unit 10 on the two-dimensional plane, the movable operation unit 10 does not cause rotation around the Z-axis. In addition, rotation around the X-axis and rotation around the Y-axis are also regulated. Thereby, the movable operation unit 10 does not change its posture.

In the present embodiment, the operation apparatus 1 enables movement of the movable operation unit 10 in the two dimensional direction. In addition, the operation apparatus 1 includes a counterforce application unit 30 and a counterforce transmission unit 200. The counterforce application unit 30 applies a counterforce to an operation in the two dimensional direction. The counterforce transmission unit 200 transmits the counterforce caused by the counterforce application unit 30 to the movable operation unit 10. The operation apparatus 1 further includes an operation detection unit 40 to detect operation quantity of the operation knob 13 (movable operation unit 10) such as the moving direction and a movement of the movable operation unit 10 in the two dimensional direction. The counterforce application unit 30, the counterforce transmission unit 200, and the operation detection unit 40 are located in the apparatus case 101.

The counterforce transmission unit 200 is a pantograph-type linkage mechanism connected to the operation shaft portion 12 of the movable operation unit 10. The linkage mechanism 200 has a linkage structure including two or more arms 201 to 204 having two or more link-connected link arms 210, 220. First one end of the link arms 210, 220 is mounted to a stationary shaft portion 205 on the side of the main body 100 to be rotatable around the Z-axis. Second one end of the link arms 210, 220 is mounted to the movable operation unit 10 to be rotatable around the Z-axis. In the present structure, at least the movable operation unit 10 on the side of the second end is movable in the two-dimensional direction specified by the X-axis and the Y-axis.

Specifically, as shown in FIGS. 4 and 5, the linkage mechanism 200 includes the stationary shaft portion 205 provided to the base plate 104 on the side of the main body 100. The linkage mechanism 200 further includes the first link arm 210 and the second link arm 220. The first link arm 210 includes the first arm 201, a first intermediate movable shaft portion 206, and the second arm 202. The first arm 201 has one end mounted to the stationary shaft portion 205 to be rotatable around the Z-axis. The first intermediate movable shaft portion 206 is provided in an intermediate position of the first arm 201 in the longitudinal direction. The second arm 202 has one end mounted to the first intermediate movable shaft portion 206 to be rotatable around the Z-axis. The second link arm 220 includes the third arm 203, a second intermediate movable shaft portion 208, and the fourth arm 204. The third arm 203 has one end mounted to the stationary shaft portion 205 to be rotatable around the Z-axis. The second intermediate movable shaft portion 208 is provided in an intermediate position of the third arm 203 in the longitudinal direction. The fourth arm 204 has one end mounted to a movable shaft portion 207 to be rotatable around the Z-axis. The second arm 202 and the fourth arm 204 of the first link arm 210 and the second link arm 220 are link-connected with each other to be rotatable around the Z-axis. A stationary shaft portion (second stationary shaft portion) other than the stationary shaft portion (first stationary shaft portion) 205 may be provided to the base plate 104 on the side of the main body 100, and the one end of the third arm 203 may be mounted to the second stationary shaft portion. The link connection is connected to the operation shaft portion 12 of the movable operation unit 10 to be rotatably around the Z-axis. Alternatively, the link connection may be connected to the second arm 202 or the fourth arm 204. As shown in FIGS. 10A to 10G, when the movable operation unit 10 is moved in the two-dimensional direction, the linkage mechanism 200 expands and contracts centered on the stationary shaft portion 205.

The pair of first arms 201 and 203 is rotatably connected with the stationary shaft portion 205 on the side of the main body 100. The pair of first arms 201 and 203 has free ends provided with rack members 211 and 221. The rack members 211 and 221 respectively have teeth portions 212 and 222 along the rotation loci of the arms 201 and 203. Actuators (motors) 31 and 32 have output shaft portions 33, 34 integrally provided with gears 412 and 422 to be integrally rotatable. The gears 412 and 422 are meshed with the teeth portions 212 and 222. The actuators 31 and 32 function as the counterforce application unit 30. Rack members 211 and 221 swing around the Z-axis direction of the stationary shaft portion 205 as the movable operation unit 10 moves in the two dimensional direction. The swing of the rack member 211 and 221 is converted to rotation of the rotational output shaft portions 33 and 34 via the gears 412 and 422. The actuators 31 and 32 apply driving force to the rotational output shaft portions 33 and 34 so as to disturb or accelerate rotation of the rotational output shaft portions 33 and 34 accompanied with movement of the movable operation unit 10 in the two dimensional direction. A control unit 2 controls driving power of the actuators 31 and 32 to apply counterforce to the rotational output shaft portions 33 and 34 according to indication of the pointing image on the screen. The upper end of the actuators 31 and 32 are screwed to the base plate 104 on the side of the main rear surface 104b of the base plate 104 using a fastening member 108. The lower end of the actuators 31 and 32 are located on a sole plate material 105 provided on the bottom surface of the lower case 102.

Potentiometers 41 and 42 are mounted on the rotational output shaft portions 33 and 34 to output detection signals each representing an amount of rotation. The rack members 211 and 221 swing around the axis of the stationary shaft portion 205 with movement of the movable operation unit in the two dimensional direction. The swing motions of the rack member 211 and 221 are converted into rotary motions of the rotational output shaft portions 33 and 34 via the gears 412 and 422. The amount of rotation of each of the rotational output shaft portions 33 and 34 reflects movable position information on the movable operation unit such as the swing direction and the amount of swing of the rack member 211 and 221. The potentiometers 41 and 42 send detection signals each representing an amount of the rotation to the control unit 2. The control unit 2 calculates the movement of the movable operation unit 10 from the inputted detection signal. The control unit 2 moves the pointing image (pointer) indicated on the screen of the display device according to the calculated movement. The potentiometers 41 and 42 are equivalent to a movement detection unit 40. The control unit 2 functions as an instructed position detection unit to calculate an instructed position of the movable operation unit 13 on the two-dimensional operation surface based on the rotation angle of the arms 201 and 203 of the linkage mechanism 200. The potentiometers 41 and 42 are magnetism-type rotation detectors including magnets 41b and 42b and detection units 41a and 41b. The magnets 41b and 42b are integrally rotatable with the rotational output shaft portions 33 and 34 of the actuators 31 and 32. The detection units 41a and 41b detect change in the magnetism caused with rotation of the magnets 41b and 42b. The potentiometers 41 and 42 may be integrated with the gear 412 and 422 to be potentiometer gears.

As shown in FIG. 11, the control unit 2 includes a CPU, a ROM, a RAM, and the like. The control unit 2 connects an external storage device 70, a signal input unit 44, a signal input unit 45, the first and second actuators 31 and 32, and a display driver 61 with each other. The signal input unit 44 receives a switch signal from a determination switch device 29 and sends the switch signal to the control unit 100. The signal input unit 45 receives detection signals from the potentiometers 41 and 42 and sends the detection signals to the control unit 100. The first and second motor drivers 43 and 44 drive the first and second actuators 31 and 32 according to actuator driving signals outputted from the control unit 100. The display driver 61 drives the display device 60 according to a display device driving signal outputted from the control unit 100.

The external storage device 70 includes various generally-known programs executed by the control unit 2 for causing operations of a pointing device. For example, the external storage device 70 stores a program for indicating a button B on the screen 50a of the display device 60 based on the detection signal from the potentiometers 41 and 42 representing a moving operation of the operation knob 13 in the two dimensional direction. The external storage device 70 further stores a program for calculating the display position of the pointer P and a program for moving the pointer P on the screen 60a based on the calculated display position of the pointer P. The external storage device 70 further stores a program for performing a driving power control of the actuators 31 and 32 to apply counterforce as the pointer P approaches the button B indicated on the screen. The external storage device 70 further stores a program for performing a driving power control of the actuators 31 and 32 to apply counterforce to disturb the pointer P located on the button B indicated on the screen so as not to move the pointer P out of the button B. The external storage device 70 further stores a program for performing a control corresponding to the button B indicated on the screen when the determination switch device 29 is operated on the button B.

One embodiment of the present invention is described above. It is noted that the one embodiment is an example of the present invention. The present invention is not limited to the one embodiment and may be arbitrary modified to various forms by skilled person as long as being in the gist of the present invention. As follows, other embodiments will be described.

Figure 13:
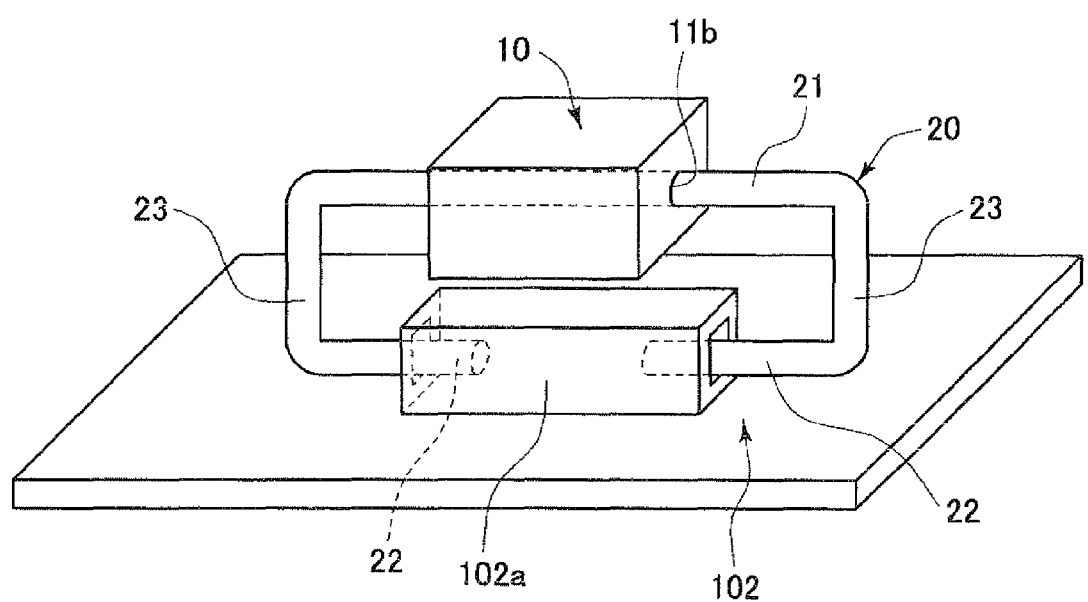
FIG. 13 is a schematic perspective view showing a moving operation of the operation apparatus in the two-dimensional direction.
Figure 14A:
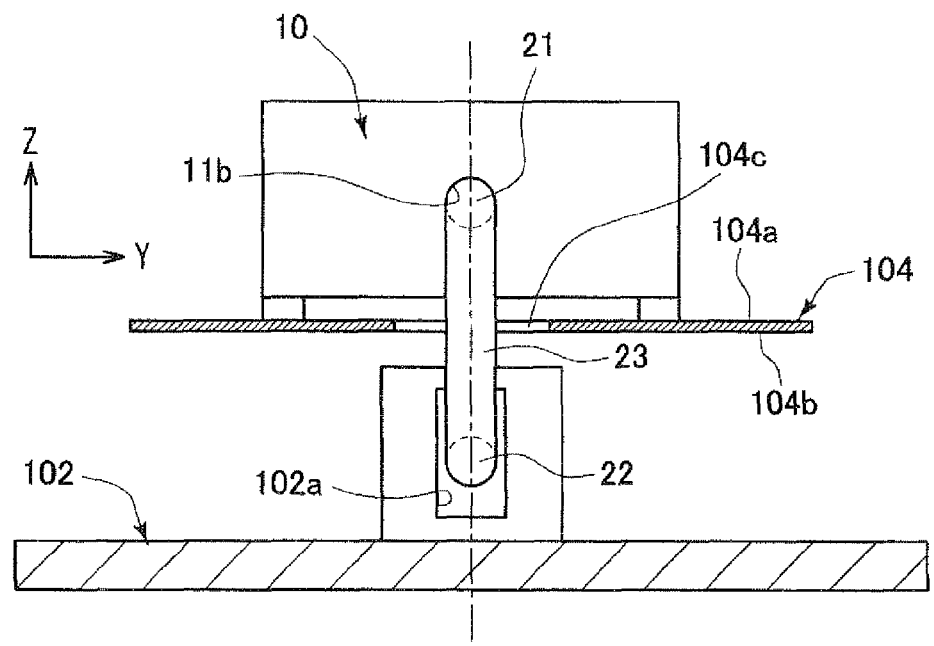
FIGS. 14A and 14B are views showing an operation of the operation apparatus in the Y-axis direction.
Figure 14B:
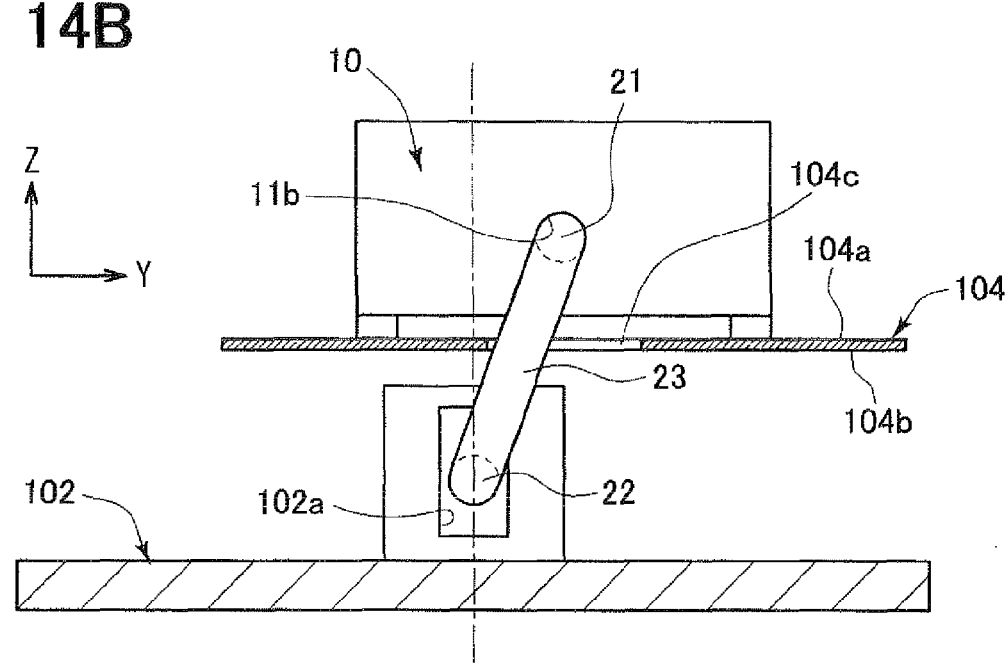

In the above embodiment, a Z-axis movement absorption mechanism is provided for absorbing a movement in the Z-axis direction on the swing tip end side caused by the swing motion of the swing member 20 around the swing axis. The Z-axis movement absorption mechanism includes the swing shaft portion 22 of the swing member 20 and the swing support member 102a of the main body 100. FIGS. 13, 14A and 14B are schematic diagrams of the embodiment. The fitting groove 102a, which supports the swing shaft portion 22 to enable swinging of the swing shaft portion 22, has a large opening width in the Z-axis direction, such that the sliding shaft portion 22 of the swing member 20 is movable relative to the main body 100 in the Z-axis direction. In the present structure, even when the swing member 20 is moved in the Z-axis direction with a swing motion around the swing axis, the position of the swing member 20 relative to the main body 100 in the Z-axis direction can be arbitrarily adjusted. In addition, the sliding member 11 of the movable operation unit 10 is in contact with the base surface 104a of the main body 100. Thereby, the sliding member 11 can be constantly maintained on the contact position (Z-axis position retention mechanism).

Figure 15A:
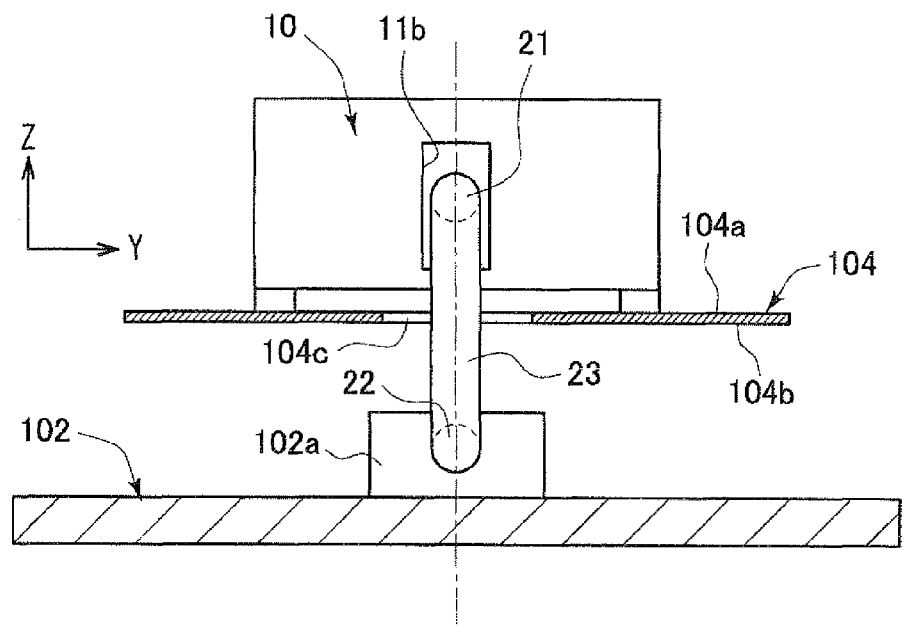
FIGS. 15A and 15B are views showing an operation of the operation apparatus in the Y-axis direction according to a modification of FIGS. 13, 14A and 14B.
Figure 15B:
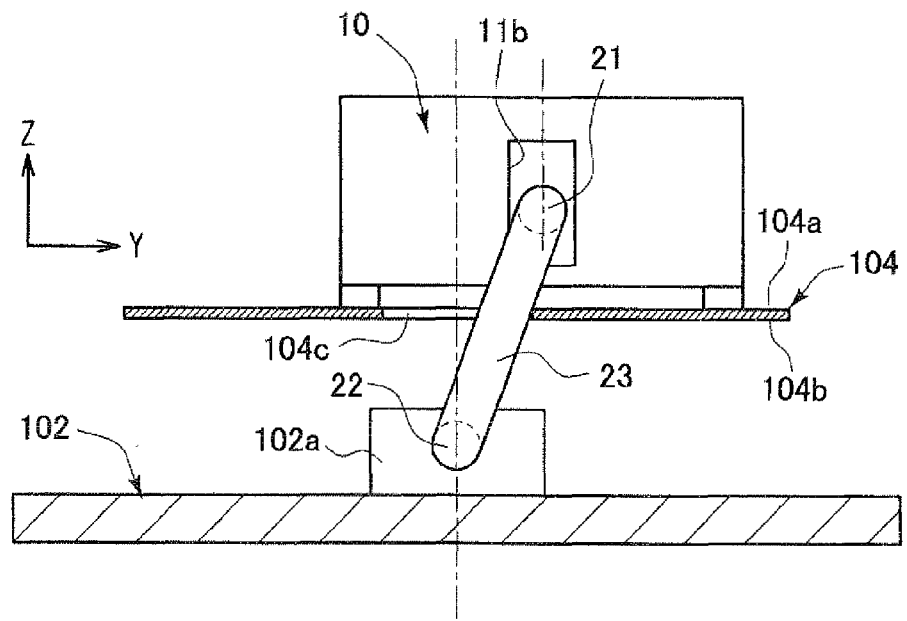
Figure 16A:
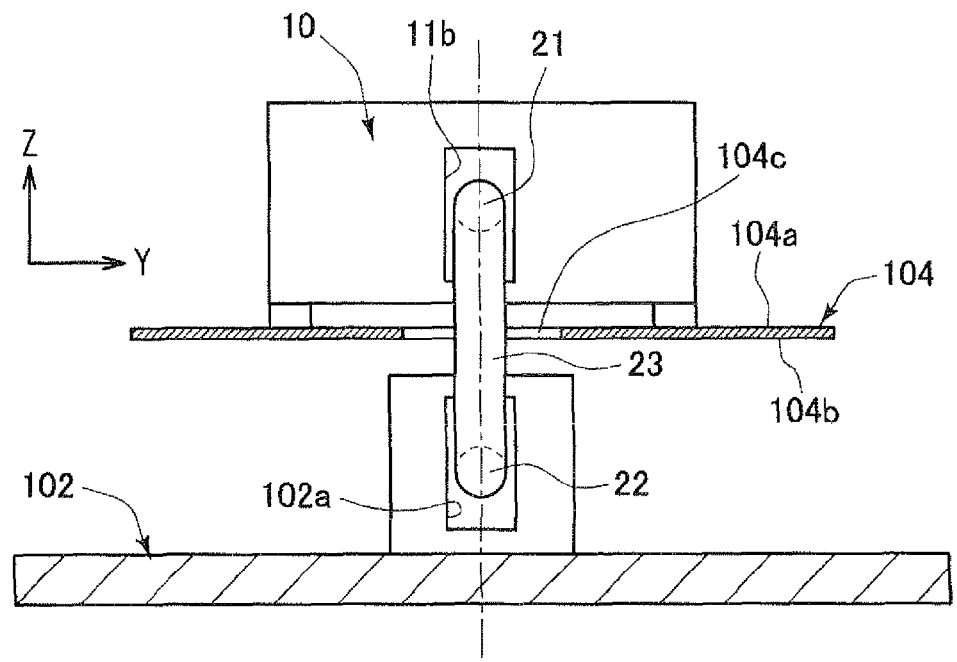
FIGS. 16A and 16B are views showing an operation of the operation apparatus in the Y-axis direction according to a modification of FIGS. 13 to 15B.
Figure 16B:
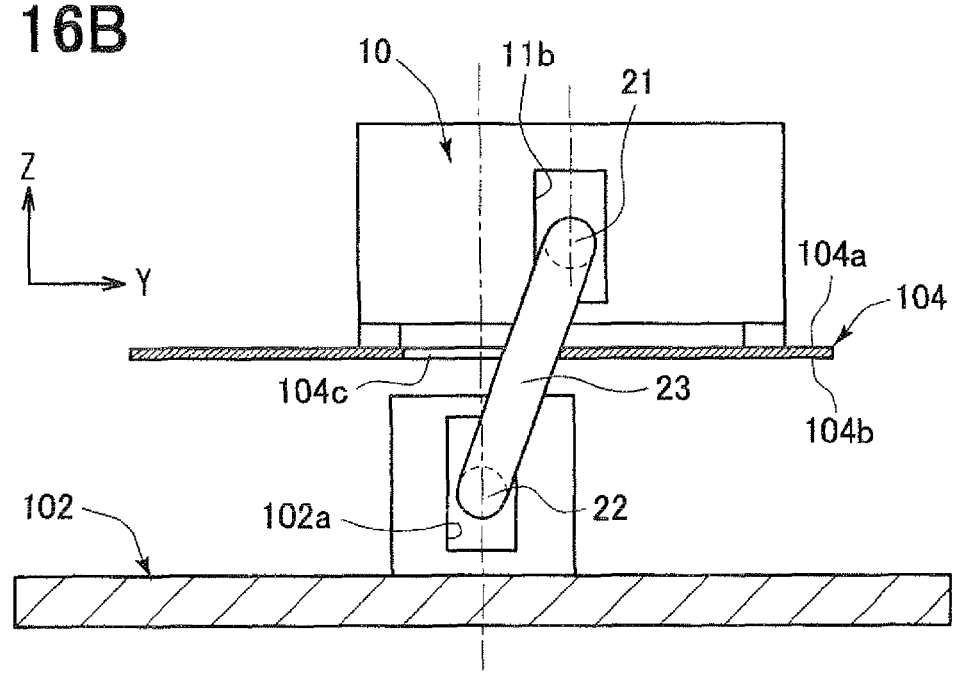

As shown in FIGS. 16A and 16B, the Z-axis movement absorption mechanism may include the Z-axis movement absorption mechanism in the above embodiment as a first Z-axis movement absorption mechanism. In this case, the Z-axis movement absorption mechanism may further include a second Z-axis movement absorption mechanism including the sliding rail portion 21 of the swing member 20 and the slidable holding portion 11b of the movable operation unit 10. As shown in FIGS. 15A and 15B, the Z-axis movement absorption mechanism may include only the second Z-axis movement absorption mechanism. In the second Z-axis movement absorption mechanism, the insertion opening 11b of the sliding member 11 has the long opening width in the Z-axis direction. The sliding rail portion 21 is inserted into the insertion opening 11b. In the present structure, the sliding rail portion 21 of the swing member 20 is movable in the Z-axis direction relative to the sliding member 11 of the movable operation unit 10. In the present structure, even when the swing member 20 is moved in the Z-axis direction with a swing motion around the swing axis, the position of the swing member 20 relative to the movable operation unit 10 in the Z-axis direction can be arbitrarily adjusted. In addition, the sliding member 11 of the movable operation unit 10 is in contact with the base surface 104a of the main body 100. Thereby, the sliding member 11 can be constantly maintained on the contact position (Z-axis position retention mechanism). In the present embodiment, the first Z-axis movement absorption mechanism includes the swing member 20 (swing shaft portion 22) and the main body 100 (swing support member 102a). The second Z-axis movement absorption mechanism includes the swing member 20 (sliding rail portion 21) and the movable operation unit 10 (slidable holding portion 11b). The Z-axis movement absorption mechanism may include either the first Z-axis movement absorption mechanism or the second Z-axis movement absorption mechanism. Alternatively, the Z-axis movement absorption mechanism may include both the first Z-axis movement absorption mechanism and the second Z-axis movement absorption mechanism.

In the above embodiment, the linkage mechanism is provided for applying the counterforce and detecting an operation. Alternatively, a generally-known pointing device 90 such as a gimbal-type joystick accommodating a counterforce actuator and a potentiometer may be provided.

It suffices that the operation apparatus includes: i) the movable operation unit on the main body to be operated on the two-dimensional operation surface specified by the X-axis and the Y-axis perpendicular to each other; ii) a Y-axis movable object supported to be rotatable around an axis extended in the X-axis direction relative to the main body 100 and movable in the Y-axis direction with rotation around the axis; iii) a sliding rail portion provided to the Y-axis movable object such that the movable operation unit is slidable in the X-axis direction, and the movable operation unit 10 is movable in the two dimensional direction with sliding in the X-axis direction and rotation in the Y-axis direction. The Y-axis movable object is not limited to the swing member 20 described in the above embodiment. For example, the Y-axis movable object may be a roller movable object 20' as shown in FIGS. 17 and 18.

Figure 17:
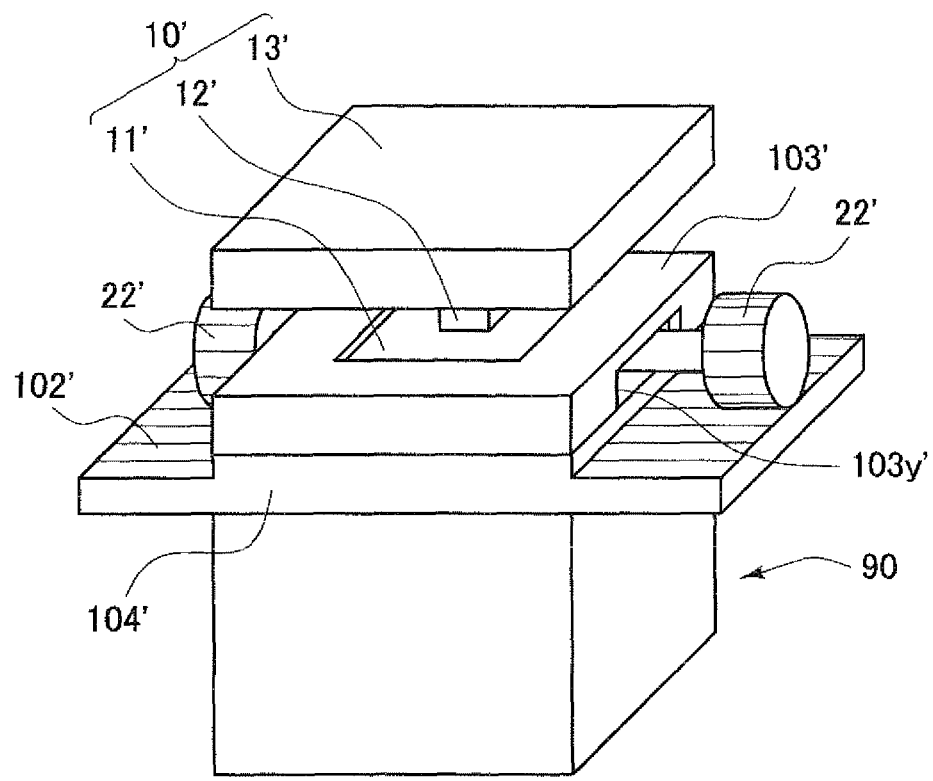
FIG. 17 is a schematic perspective view showing an operation apparatus according to another modification.
Figure 18:
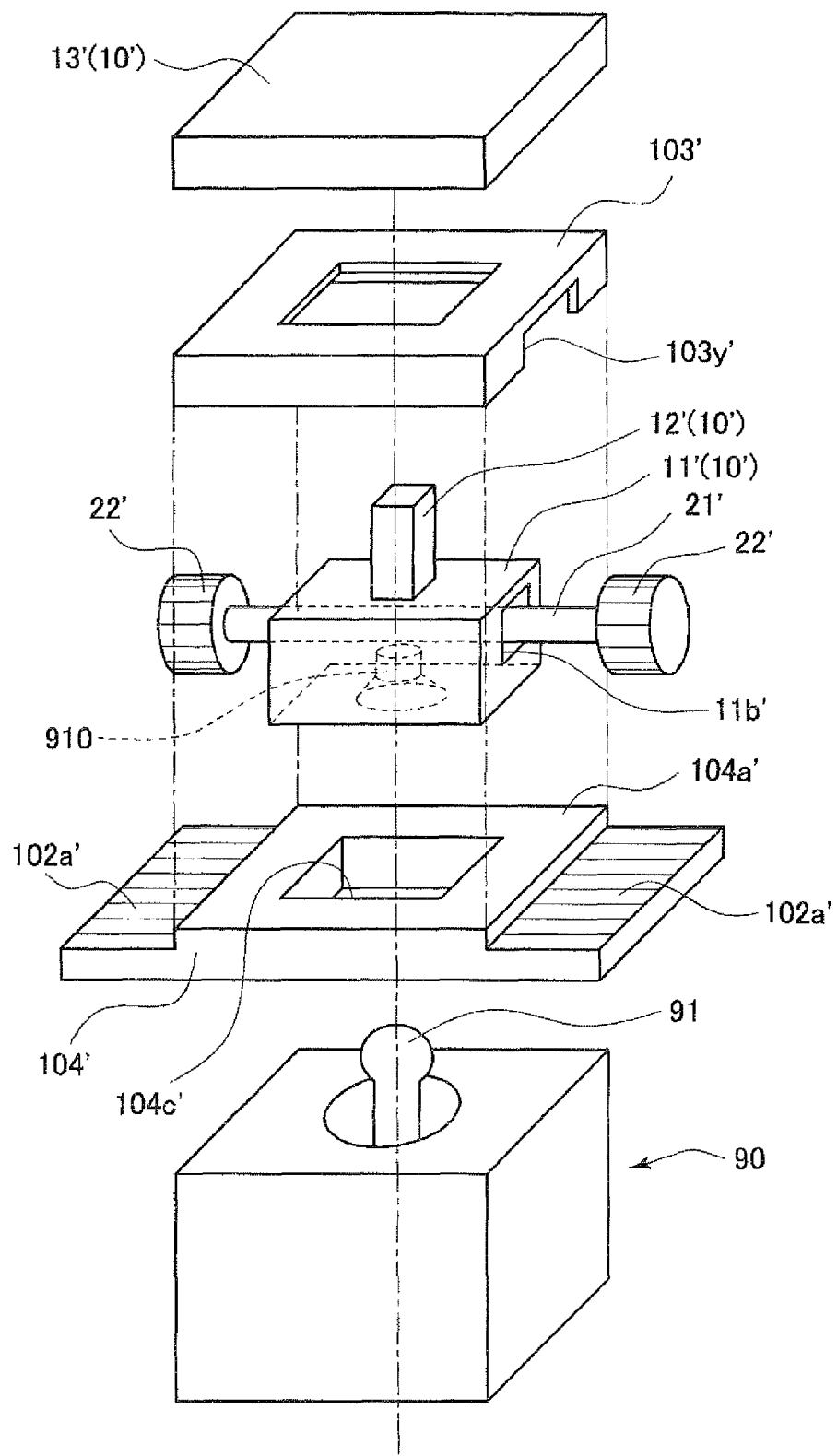
FIG. 18 is an exploded perspective view showing the operation apparatus of FIG. 17.

An operation apparatus shown in FIGS. 17 and 18 includes a shaft (sliding rail portion) 21' and gears 22' fixed to both ends of the shaft 21'. A sliding member 11' is mounted to the shaft 21' such that the sliding member 11' is slidable in the X-axis direction, and relative movement of the sliding member 11' to the shaft 21' in the Z-axis direction is enabled. Specifically, the sliding member 11' has an opening (rotary support portion) 11b' extended through the sliding member 11'. The shaft 21' is inserted into an opening 11b' such that the shaft 21' is rotatably supported by the sliding member 11'. The opening (rotary support portion) 11b' has an opening length in the Z-axis direction. The opening length of the opening 11b' in the Z-axis direction is greater than the width of the shaft 21' in the Z-axis direction. Thereby, the opening 11b' enables movement of the shaft 21' in the Z-axis direction. The sliding member 11' is slidable along the shaft 21' while being in contact with (surface contact) the base surface 104a' of a base member 104'. The sliding member 11' is regularly retained to be in contact with a base surface 104a'. A pair of racks 102a' are opposed to each other in the X-axis direction. The racks 102a' are linearly extended in the Y-axis direction. The gears 22 located on both ends of the shaft 21' are meshed with the racks 102a' and enabled to roll on the racks 102a' in the Y-axis direction. In this way, the sliding member 11 is enabled to move in the Y-axis direction in parallel, without movement in the Z-axis direction.

The sliding member 11' is mounted to a tip end of a swing lever 91 enabled to swing in the two dimensional direction in the gimbal-type joystick of the generally-known pointing device 90. A position sensor accommodated in the pointing device 90 detects the position of the sliding member 11'. The counterforce actuator applies a counterforce to the sliding member 11'. The swing lever 91 extends through an opening 104c' in the center of the base member 104'. A lower end of the sliding member 11' has an opening 910, which opens downward. The swing lever 91 has a sphere portion being in surface contact with the lower end of the sliding member 11' at the opening 810 such that the swing lever 91 is slidably supported in the opening 910. The sliding member 11' moves in the Z-axis direction with a swing motion of the swing lever 91. This movement of the sliding member 11' in the Z-axis direction is absorbed by the opening (rotary support portion) 11b. Thereby, the sliding member 11' is retained to be in contact with the base surface 104a'.

A movable operation unit 10' includes the sliding member 11 having an operation shaft portion 12' and an operation knob 13' integrally fixed to the upper side of the operation shaft portion 12'. A cover member 103' surrounds the upper portion of the movable operation unit 10' in the Z-axis direction. The operation shaft portion 12' projects from the upper portion of the movable operation unit 10' in the Z-axis direction. The operation knob 13' is located on the tip end of the operation shaft portion 12'. The lateral sides of the cover member 103' in the Y-axis direction (X-axis direction) respectively have openings 103y' through which the shaft 21' extends in the Y-axis direction (X-axis direction). The operation knob 13' is in a shape such that rotation of the operation knob 13' can be visually recognized when rotating around the Z-axis. The operation knob 13' is substantially in a rectangular shape when viewed from the top. The operation knob 13' has rounded corners.

In the present structure of the operation apparatus 1', the operation knob 13 is movable with linear sliding only in the one X-axis direction. In addition, the operation knob 13 is with rotation (swinging) in the Y-axis direction. Therefore, the operation knob 13 is movable in parallel independently (with independent mechanisms) in the X-axis direction and the Y-axis direction. Thus, the linear movement of the operation knob 13 is limited to the one X-axis direction, thereby an operation feeling can be enhanced.

Summarizing the above embodiments, an operation apparatus including: a main body; a movable operation unit movable on a two-dimensional operation surface of the main body, the two-dimensional operation surface defined by an X-axis and a Y-axis perpendicular to each other; and a Y-axis movable object including a Y-axis movable portion supported and rotatable around an axis and movable in the Y-axis direction when rotating around the axis, the axis extending in the X-axis direction relative to the main body. The Y-axis movable portion includes a sliding rail portion on which the movable operation unit is slidable in the X-axis direction. The movable operation unit is operable to perform a sliding movement in the X axial direction and a movement in the Y axial direction accompanied with rotation to move in the two dimensional direction in parallel while regularly and constantly maintaining a posture of the movable operation unit.

Specifically, the operation apparatus includes a swing member supported and rotatable around a swing axis extending in the X-axis direction relative to the main body. The swing member has a sliding rail portion outside the swing axis. The sliding rail portion is located on a side of the swing end configured to swing in the Y-axis direction. The movable operation unit is mounted to the sliding rail portion and slidable on the sliding rail portion while being guided in the X-axis direction. In the present structure, a two-dimensional operation of the movable operation unit is enabled by a sliding movement in the X axial direction and a swing movement in the Y axial direction.

In the present structure, the moving operation of the movable operation unit in the Y-axis direction is guided by rotation around the swing axis in the Y-axis direction. On the other hand, the moving operation of the movable operation unit in the X-axis direction is guided by the sliding rail portion. Thereby, the movable operation unit is movable in parallel without changing the posture relative to both the X-axis and the Y-axis. Therefore, the movable operation unit does not rotate around the Z-axis perpendicular to both the X-axis and the Y-axis. For example, when the movable operation unit is in a shape visually recognizable its rotation around the Z-axis, rotation of the movable operation unit may be conspicuous with rotation caused by an operation of the movable operation unit. Consequently, a design nature may be spoiled. Nevertheless, according to the present structure, a design nature can be maintained. In addition, according to the present structure, the moving operation in the Y-axis direction occurs with rotation. Therefore, an operation feeling can be improved compared with the structure of Japanese Patent Application 2008-246263 including an X-Y slidable mechanism having a linear slidable structure in the two directions. Further, the present structure includes a combination of two simple mechanisms of a swing support structure and a slidable support structure to enable restriction of rotation of the movable operation unit. Therefore, the structure can be simplified compared with JP-A-2008-173757. Thus, a manufacturing cost can be reduced.

According to the present structure, the operation apparatus further includes a Z-axis position retention mechanism configured to retain a position of the movable operation unit, which is mounted on the swing end, in the Z-axis direction relative to the main body at a constant position by absorbing movement of the swing end in the Z-axis direction accompanied with a swing motion around the swing axis of the swing member. For example, when the operation apparatus is a pointing device for moving a pointing image indicated on an indication screen, it may be preferable that the movable operation unit is configured to enable a parallel shift operation (two-dimensional operation) on a two-dimensional plane similarly to the pointing image on the indication screen. In this case, a user can easily recognize correspondence between an operation direction of the movable operation unit and a moving direction of the pointing image, thereby to enhance operability. According to the present structure, a linear movement of the movable operation unit in the Y-axis direction is enabled similarly to the linear sliding in the X-axis direction. Therefore, the movable operation unit is operated by a parallel shift on the two-dimensional plane.

For example, the Z-axis position retention mechanism may include a Z-axis movement absorption mechanism configured to permit the sliding rail portion to move in the Z-axis direction relative to the movable operation unit and a Z-axis positioning mechanism configured to maintain the movable operation unit at a predetermined position in the Z-axis direction. According to the present structure, the movement of the movable operation unit in the Z-axis direction accompanied with a swing motion of the swing member can be adjusted between the movable operation unit and the sliding rail portion to which the movable operation unit is mounted. Therefore, the position of the main body in the Z-axis direction relative to the movable operation unit can be maintained at a constant position. In this case, a Z-axis position retention mechanism may be configured of a movable operation unit including a slidable holding portion configured to: i) support the sliding rail portion of the swing member to be slidable in the X-axis direction, ii) regulate relative movement of the sliding rail portion in the Y-axis direction while supporting the sliding rail portion; iii) permit relative movement of the sliding rail portion in the Z-axis direction. Specifically, the sliding rail portion of the swing member is a linear shaft portion extending in the X-axis direction.

The slidable holding portion of the movable operation unit is an opening extending through the slidable holding portion in the X-axis direction to enable insertion of the linear shaft portion in the X-axis direction. The slidable holding portion opens on one side in the Z-axis direction to permit relative movement of the inserted linear shaft portion in the Z-axis direction. The slidable holding portion has Y-axis opposed wall portions opposed to each other to sandwich the inserted linear shaft portion from both sides in the Y-axis direction. In this case, the Z-axis movement absorption mechanism includes the sliding rail portion (linear shaft portion) of the swing member and the slidable holding portion of the movable operation unit (opening). According to the present structure, the Z-axis movement absorption mechanism can be easily produced by forming a linear shaft portion as the sliding rail portion and an opening having the opening shape as the slidable holding portion.

For example, the Z-axis position retention mechanism may include a Z-axis movement absorption mechanism configured to permit the swing member to move in the Z-axis direction relative to the main body and a Z-axis positioning mechanism configured to maintain the movable operation unit mounted to the swing end of the swing member at a predetermined position in the Z-axis direction. According to the present structure, the movement of the movable operation unit in the Z-axis direction accompanied with a swing motion of the swing member can be adjusted between the main body and the swing member to which the movable operation unit is mounted. Therefore, the position of the movable operation unit in the Z-axis direction relative to the main body can be maintained at a constant position. In this case, a Z-axis position retention mechanism may be configured of the main body including a swing support member configured to: i) support a swing shaft portion of the swing member rotatable around the swing axis; ii) regulate relative movement of the swing shaft portion in the Y-axis direction while supporting the swing shaft portion; iii) permit the swing shaft portion to move in the Z-axis direction. Specifically, the swing shaft portion of the swing member is a linear shaft portion extending in the X-axis direction.

The swing support member of the main body may be an opening supporting the linear shaft portion rotatable around the swing axis, the opening including: i) an X-axis opposed wall portions regulating relative movement of the supported linear shaft portion in the X-axis direction; and ii) a Y-axis opposed wall portions opposed to each other to sandwich the supported linear shaft portion from both sides in the Y-axis direction. The opening of the swing support member opens on one side in the Z-axis direction to permit relative movement of the supported linear shaft portion in the Z-axis direction. According to the present structure, the Z-axis movement absorption mechanism can be easily produced by forming a linear shaft portion as the swing shaft portion and an opening having the opening shape as the swing support member.

The movable operation unit may be in contact with a base surface of the main body in the Z-axis direction and slidable on the base surface. In this case, the position of the movable operation unit in the Z-axis direction can be constantly maintained at the contact position with the base surface. Therefore, the Z-axis positioning mechanism can be easily configured of the movable operation unit and the base surface. The movable operation unit may be in surface contact with the base surface and may be slidable on the base surface. In this case, the posture of the movable operation unit can be constantly maintained not to be rotatable around the X-axis. Thus, play of the operation knob can be restricted. The sliding rail portion of the swing member may have a liner shaft portion being in a tubular shape to extend in the X-axis direction. The opening may hold the linear shaft portion inserted in the X-axis direction and rotatable around the X-axis. The sliding rail portion is formed in a tubular shape to linearly extend in the X-axis direction. The sliding rail portion is supported in the sliding supporting member to be rotatable and slidable. Thus, the posture of the movable operation unit can be maintained around the X-axis with small frictional resistance.

The operation apparatus may further include a linkage mechanism including a link arm having at least two arms link-connected with each other. The linkage mechanism has a first one end mounted to a stationary shaft portion provided on a side of the main body and rotatable around the Z-axis relative to the stationary shaft portion. The linkage mechanism has a second one end mounted to the movable operation unit and rotatable around the Z-axis relative to the movable operation unit. The linkage mechanism is configured to enable at least the movable operation unit to move on the two-dimensional operation surface. In this case, the operation apparatus may further include a counterforce application unit configured to apply a counterforce to disturb a rotation motion of each of the at least two arms of the linkage mechanism.

The operation apparatus may further include an instructed position detection unit configured to calculate a position of the movable operation unit on the two-dimensional operation surface in the linkage mechanism based on rotation angles of the at least two arms.

The linkage mechanism may include a first link arm including a first stationary shaft portion provided in the main body, a first arm mounted to the first stationary shaft portion and rotatable around the Z-axis, a first intermediate movable shaft portion provided in the first arm, and a second arm mounted to the first intermediate movable shaft portion and rotatable around the Z-axis. The linkage mechanism may include a second link arm including a third arm mounted to a second stationary shaft portion, which is provided in the main body, or the first arm and rotatable around the Z-axis, a second intermediate movable shaft portion provided in the third arm, a fourth arm mounted to the second intermediate movable shaft portion and rotatable around the Z-axis. The first link arm and the second link arm are link-connected at the second arm and the fourth arm and rotatable around the Z-axis. The movable operation unit is mounted to one of the second arm and the fourth arm or a link-connection between the second arm and the fourth arm and rotatable around the Z-axis.

The above structures of the embodiments can be combined as appropriate.

The above processings such as calculations and determinations are not limited being executed by the control unit 2. The control unit may have various structures including the control unit 2 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An operation apparatus comprising:
   a main body;
   a movable operation unit movable on a two-dimensional operation surface of the main body, the two-dimensional operation surface defined by an X-axis and a Y-axis perpendicular each other;
   a Y-axis movable object including a Y-axis movable portion movable in the Y-axis direction when rotating around an rotation axis, the rotation axis extending in the X-axis direction relative to the main body, wherein
   the Y-axis movable portion includes a sliding rail portion on which the movable operation unit is slidable in the X-axis direction,
   the movable operation unit is operable to slide in the X axial direction and move in the Y axial direction accompanied with rotation of the Y-axis movable portion around the rotation axis to perform a parallel shift in the two dimensional direction while regularly and constantly maintaining a posture of the movable operation unit, the Y-axis movable object is a swing member extending in the X-axis direction relative to the main body, the Y-axis movable object being rotatable around the rotation axis as a swing axis, the Y-axis movable portion is formed in a swing end outside the swing axis and configured to swing in the Y-axis direction, and a sliding movement of the movable operation unit in the X axial direction and a swing motion of the swing member in the Y axial direction enables a two-dimensional operation of the movable operation unit.

2. The operation apparatus according to claim 1, wherein the movable operation unit is mounted on the swing end, the operation apparatus further comprising:

a Z-axis position retention mechanism configured to retain a position of the movable operation unit in the Z-axis direction relative to the main body at a constant position by absorbing movement of the swing end in the Z-axis direction accompanied with a swing motion of the swing member around the swing axis.

3. The operation apparatus according to claim 2, wherein the Z-axis position retention mechanism includes:
 a Z-axis movement absorption mechanism configured to permit the sliding rail portion to move in the Z-axis direction relative to the movable operation unit; and
 a Z-axis positioning mechanism configured to hold the movable operation unit at a predetermined position in the Z-axis direction.

4. The operation apparatus according to claim 3, wherein the movable operation unit includes a slidable holding portion configured to:
i) support the sliding rail portion of the swing member to permit sliding in the X-axis direction,
ii) regulate movement of the sliding rail portion relative to the slidable holding portion in the Y-axis direction while supporting the sliding rail portion; and
iii) permit movement of the sliding rail portion relative to the slidable holding portion in the Z-axis direction while supporting the sliding rail portion, and
the Z-axis movement absorption mechanism includes the sliding rail portion of the swing member and the slidable holding portion of the movable operation unit.

5. The operation apparatus according to claim 4, wherein the sliding rail portion of the swing member is a linear shaft portion extending in the X-axis direction,
the slidable holding portion of the movable operation unit has an opening extending through the slidable holding portion in the X-axis direction to enable insertion of the linear shaft portion in the X-axis direction,
the slidable holding portion has an opening on one side in the Z-axis direction to permit relative movement of the inserted linear shaft portion in the Z-axis direction,
the slidable holding portion has Y-axis opposed wall portions opposed to each other to sandwich the inserted linear shaft portion from both sides in the Y-axis direction, and
the Z-axis movement absorption mechanism includes the linear shaft portion of the swing member and the opening of the slidable holding portion.

6. The operation apparatus according to claim 2, wherein the Z-axis position retention mechanism includes:
 a Z-axis movement absorption mechanism configured to permit the swing member to move in the Z-axis direction relative to the main body; and
 a Z-axis positioning mechanism configured to hold the movable operation unit mounted to the swing end of the swing member at a predetermined position in the Z-axis direction.

7. The operation apparatus according to claim 6, wherein the main body includes a swing support member configured to:
i) support a swing shaft portion of the swing member to permit rotation around the swing axis;
ii) regulate movement of the swing shaft portion relative to the swing support member in the Y-axis direction while supporting the swing shaft portion; and
iii) permit movement of the swing shaft portion relative to the swing support member in the Z-axis direction while supporting the swing shaft portion, and
the Z-axis movement absorption mechanism includes the swing shaft portion of the swing member and the swing support member of the main body.

8. The operation apparatus according to claim 7, wherein the swing shaft portion of the swing member is a linear shaft portion extending in the X-axis direction,
the swing support member of the main body has an opening supporting the linear shaft portion rotatable around the swing axis, the opening defined:
i) X-axis opposed wall portions regulating relative movement of the supported linear shaft portion in the X-axis direction; and
ii) Y-axis opposed wall portions opposed to each other to sandwich the supported linear shaft portion from both sides in the Y-axis direction,
the opening of the swing support member opens on one side in the Z-axis direction to permit relative movement of the supported linear shaft portion in the Z-axis direction, and
the Z-axis movement absorption mechanism includes the linear shaft portion of the swing member and the opening of the main body.

9. The operation apparatus according to claim 3, wherein the movable operation unit is in contact with a base surface of the main body in the Z-axis direction and slidable on the base surface, and
the Z-axis positioning mechanism includes the movable operation unit and the base surface.

10. The operation apparatus according to claim 9, wherein the movable operation unit is in surface contact with the base surface and slidable on the base surface.

11. The operation apparatus according to claim 10, wherein
the sliding rail portion is in a tubular shape and linearly extends in the X-axis direction, and
the opening holds the linear shaft portion inserted in the X-axis direction and rotatable around the X-axis.

12. The operation apparatus according to claim 1, further comprising:
a linkage mechanism including a link arm having at least two arms link-connected with each other, wherein
the linkage mechanism has a first one end mounted to a stationary shaft portion provided on a side of the main body and rotatable around the Z-axis relative to the stationary shaft portion, the linkage mechanism has a second one end mounted to the movable operation unit and rotatable around the Z-axis relative to the movable operation unit, and the linkage mechanism is configured to enable at least the movable operation unit to move on the two-dimensional operation surface.

13. The operation apparatus according to claim 12, further comprising:

a counterforce application unit configured to apply a counterforce to disturb a rotation motion of each of the at least two arms of the linkage mechanism.

14. The operation apparatus according to claim 12, further comprising:

an instructed position detection unit configured to calculate a position of the movable operation unit on the two-dimensional operation surface based on a rotation angle of the at least two arms of the linkage mechanism.

15. The operation apparatus according to claim 12, wherein the linkage mechanism includes:

a first link arm including a first stationary shaft portion provided in the main body, a first arm mounted to the first stationary shaft portion and rotatable around the Z-axis, a first intermediate movable shaft portion provided in the first arm, and a second arm mounted to the first intermediate movable shaft portion and rotatable around the Z-axis;

a second link arm including a third arm mounted to a second stationary shaft portion, which is provided in the main body, or the first arm and rotatable around the Z-axis, a second intermediate movable shaft portion provided in the third arm, a fourth arm mounted to the second intermediate movable shaft portion and rotatable around the Z-axis, the first link arm and the second link arm are link-connected at the second arm and the fourth arm and rotatable around the Z-axis, and the movable operation unit is mounted to one of the second arm and the fourth arm or a link-connection between the second arm and the fourth arm and rotatable around the Z-axis.

16. The operation apparatus according to claim 1, wherein the movable operation unit is in a shape such that rotation of the movable operation unit is visually recognizable when rotating around the Z-axis.

* * * * *